(12) United States Patent
Zhang et al.

(10) Patent No.: US 11,729,853 B2
(45) Date of Patent: *Aug. 15, 2023

(54) COMMUNICATIONS METHOD AND WEARABLE DEVICE, COMMUNICATIONS SYSTEM, AND RELATED DEVICE

(71) Applicant: Huawei Technologies Co., Ltd., Shenzhen (CN)

(72) Inventors: Qinliang Zhang, Shenzhen (CN); Yu Zhu, Grenoble (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,294

(22) Filed: Aug. 5, 2022

(65) Prior Publication Data
US 2023/0092443 A1 Mar. 23, 2023

Related U.S. Application Data

(63) Continuation of application No. 17/183,503, filed on Feb. 24, 2021, now Pat. No. 11,445,566, which is a
(Continued)

(51) Int. Cl.
*H04W 4/80* (2018.01)
*H04W 76/19* (2018.01)
(Continued)

(52) U.S. Cl.
CPC .......... *H04W 76/19* (2018.02); *G06F 1/163* (2013.01); *H04M 1/72412* (2021.01);
(Continued)

(58) Field of Classification Search
CPC ....... H04W 4/80; H04W 88/06; H04W 76/14; H04W 76/15; H04W 76/16; H04W 76/10;
(Continued)

(56) References Cited

U.S. PATENT DOCUMENTS 7,174,187 B1 2/2007 Ngan
8,515,407 B1 8/2013 Mok et al.
(Continued)

FOREIGN PATENT DOCUMENTS

AU 2014406395 A1 4/2017
CN 201887794 U 6/2011
(Continued)

OTHER PUBLICATIONS

"How to Set Up your Sonos system," Retrieved from internet: https://www.smarthomesounds.co.uk/blog/faqs/how-to-set-up-your-sonos-system, Smart Home Sounds, Sep. 3, 2014, 3 pages.
(Continued)

*Primary Examiner* — Quan M Hua
(74) *Attorney, Agent, or Firm* — Conley Rose, P.C.

(57) ABSTRACT

In a communications method of a wearable device, if a second BLUETOOTH connection between user equipment and the wearable device is disconnected, a first BLUETOOTH connection between a network connection device and the wearable device is established, so that the network connection device may send, to the wearable device through the first BLUETOOTH connection, first information sent by the user equipment through a third communication connection to the network connection device. In this way, indirect communication between the user equipment and the wearable device is implemented by using the network connection device, so that the user equipment and the wearable device are not limited by a communication range.

20 Claims, 7 Drawing Sheets

Related U.S. Application Data continuation of application No. 16/919,729, filed on Jul. 2, 2020, now Pat. No. 10,959,280, which is a continuation of application No. 16/377,846, filed on Apr. 8, 2019, now Pat. No. 10,764,954, which is a continuation of application No. 15/511,123, filed as application No. PCT/CN2014/086492 on Sep. 15, 2014, now Pat. No. 10,285,214.

(51) Int. Cl.
| | | |
|---|---|---|
| H04W 76/10 | (2018.01) | |
| H04W 76/23 | (2018.01) | |
| H04W 36/30 | (2009.01) | |
| H04M 1/72412 | (2021.01) | |
| G06F 1/16 | (2006.01) | |
| H04W 84/12 | (2009.01) | |
| H04W 84/18 | (2009.01) | |
| H04W 36/00 | (2009.01) | |

(52) U.S. Cl.
CPC ........... *H04W 4/80* (2018.02); *H04W 36/305* (2018.08); *H04W 76/10* (2018.02); *H04W 76/23* (2018.02); *H04W 36/03* (2018.08); *H04W 84/12* (2013.01); *H04W 84/18* (2013.01)

(58) Field of Classification Search
CPC ... H04W 28/085; H04W 48/18; H04W 24/08; H04W 28/0236; H04W 84/042; H04W 84/12; H04W 28/10; H04W 28/22; H04W 28/08; H04W 4/12; H04W 40/12; H04W 40/24; H04W 52/0274; H04W 76/30; H04W 24/02; H04W 28/0268; H04W 28/0908; H04W 28/0975; H04W 28/0992; H04W 4/16; H04W 76/23; H04W 8/005; H04W 84/18; H04W 12/037; H04W 36/03; H04W 4/02; H04W 4/20; H04W 48/14; H04W 56/002; H04W 64/00; H04W 72/1221; H04W 72/52; H04W 72/542; H04W 76/11; H04W 76/18; H04W 8/04; H04W 8/205; H04W 8/22; H04W 8/24; H04W 84/20; H04W 12/33; H04W 12/43; H04W 12/47; H04W 12/50; H04W 24/10; H04W 36/0005; H04W 36/0027; H04W 36/0083; H04W 36/14; H04W 36/16; H04W 4/06; H04W 4/14; H04W 4/18; H04W 52/0261; H04W 52/50; H04W 76/19; H04W 76/20; H04W 76/25; H04W 88/00; H04L 67/75; H04L 67/566; H04M 1/72412; H04M 2250/02; H04M 1/72427; H04M 1/72403; H04M 1/6075; H04M 1/6066; H04M 1/72516; H04M 1/0202

See application file for complete search history.

(56) References Cited

U.S. PATENT DOCUMENTS

| | | | |
|---|---|---|---|
| 9,113,395 | B2 | 8/2015 | Van Phan et al. |
| 9,485,657 | B2 | 11/2016 | Bae et al. |
| 10,285,214 | B2 | 5/2019 | Zhang et al. |
| 2002/0160820 | A1 | 10/2002 | Winkler |
| 2006/0199534 | A1 | 9/2006 | Smith |
| 2007/0010256 | A1 | 1/2007 | Klabunde et al. |
| 2007/0224982 | A1 | 9/2007 | Jeon et al. |
| 2008/0076425 | A1 | 3/2008 | Khetawat et al. |
| 2009/0005111 | A1* | 1/2009 | Wang ................ H04W 16/14 455/553.1 |
| 2009/0100495 | A1* | 4/2009 | Manapragada .. H04N 21/43615 725/138 |
| 2010/0069007 | A1* | 3/2010 | Nagasawa ........... H04M 1/6066 455/41.3 |
| 2010/0202320 | A1 | 8/2010 | Bennett et al. |
| 2011/0021143 | A1 | 1/2011 | Kapur et al. |
| 2011/0039494 | A1 | 2/2011 | Shon et al. |
| 2011/0182221 | A1 | 7/2011 | Arakawa |
| 2012/0020348 | A1 | 1/2012 | Haverinen et al. |
| 2012/0040715 | A1 | 2/2012 | Fu et al. |
| 2012/0258658 | A1 | 10/2012 | Matsuo |
| 2013/0157631 | A1 | 6/2013 | Wang et al. |
| 2013/0174231 | A1 | 7/2013 | Stavropoulos et al. |
| 2014/0003237 | A1 | 1/2014 | Kenney et al. |
| 2014/0031078 | A1 | 1/2014 | Nishikawa |
| 2014/0065962 | A1 | 3/2014 | Le et al. |
| 2014/0106677 | A1 | 4/2014 | Altman |
| 2014/0119234 | A1 | 5/2014 | Kwon |
| 2014/0185499 | A1 | 7/2014 | Ray et al. |
| 2014/0320585 | A1 | 10/2014 | Igoe |
| 2014/0337748 | A1 | 11/2014 | Lee |
| 2014/0342670 | A1 | 11/2014 | Kang et al. |
| 2014/0364089 | A1 | 12/2014 | Lienhart et al. |
| 2015/0063169 | A1 | 3/2015 | Lu |
| 2015/0065055 | A1 | 3/2015 | Newham et al. |
| 2015/0065095 | A1 | 3/2015 | Seo et al. |
| 2015/0141076 | A1 | 5/2015 | Libin et al. |
| 2015/0185944 | A1 | 7/2015 | Magi et al. |
| 2015/0189425 | A1 | 7/2015 | Pang |
| 2015/0244876 | A1 | 8/2015 | Jabara et al. |
| 2015/0262067 | A1 | 9/2015 | Sridhara et al. |
| 2015/0293580 | A1 | 10/2015 | Munoz et al. |
| 2015/0350766 | A1 | 12/2015 | Schobel et al. |
| 2016/0037340 | A1 | 2/2016 | Rayment et al. |
| 2016/0066124 | A1 | 3/2016 | Chang et al. |
| 2016/0150426 | A1 | 5/2016 | Panaitopol |
| 2016/0212682 | A1 | 7/2016 | Chung et al. |
| 2016/0227496 | A1 | 8/2016 | Panteleev et al. |
| 2016/0249156 | A9 | 8/2016 | Varoglu et al. |
| 2016/0316500 | A1 | 10/2016 | Aliyar |
| 2017/0171901 | A1 | 6/2017 | Melcher et al. |
| 2017/0195175 | A1 | 7/2017 | Koss et al. |
| 2017/0195852 | A1 | 7/2017 | Theurer et al. |
| 2017/0290029 | A1 | 10/2017 | Park et al. |
| 2019/0273630 | A1 | 9/2019 | Matsuo |

FOREIGN PATENT DOCUMENTS

| | | |
|---|---|---|
| CN | 102651915 A | 8/2012 |
| CN | 103135440 A | 6/2013 |
| CN | 103179638 A | 6/2013 |
| EP | 1482686 A2 | 12/2004 |
| JP | 2001313650 A | 11/2001 |
| JP | 3600505 B2 | 12/2004 |
| JP | 2006527519 A | 11/2006 |
| JP | 2010074420 A | 4/2010 |
| JP | 2012129834 A | 7/2012 |
| JP | 2014003379 A | 1/2014 |
| JP | 2014027538 A | 2/2014 |
| KR | 20110104138 A | 9/2011 |
| RU | 2287851 C2 | 11/2006 |
| RU | 111940 U1 | 12/2011 |
| RU | 123542 U1 | 12/2012 |
| WO | 2014107469 A2 | 7/2014 |
| WO | 2015050544 A1 | 4/2015 |

OTHER PUBLICATIONS

"Setting up the Wemo Smart Light Switch, F7C030," Retrieved from internet: https://www.belkin.com/us/support-article?articleNum=8185, Feb. 12, 2020, 4 pages.

"How to set up the Wemo WiFi Smart Dimmer, F7C059," Retrieved from internet: https://www.belkin.com/us/support-article?articleNum=211577, Feb. 12, 2020, 6 pages.

"WeMo Light Switch," Retrieved from internet:https://www.youtube.com/watch?v=W3ML4zPMyHE, Jul. 22, 2013, 3 pages.

(56) References Cited

OTHER PUBLICATIONS

"Wemo—Light Switch—White/Light Gray," Retrieved from internet: https://www.bestbuy.com/site/wemo-light-switch-white-light-gray/1218832.p?skuld=1218832andintl=nosplash, Feb. 12, 2020, 3 pages.

"Wemo—Light Switch White/Light Gray," Retrieved from internet: https://www.amazon.com/-/zh/WeMo-Dimmer-Assistant-Homekit-F7C059/dp/B071RFYQFM/ref=cm_cr_arp_d_product_top?ie=UTF8, Feb. 19, 2020, 9 pages.

* cited by examiner

COMMUNICATIONS METHOD AND WEARABLE DEVICE, COMMUNICATIONS SYSTEM, AND RELATED DEVICE

CROSS-REFERENCE TO RELATED APPLICATIONS

This is a continuation of U.S. patent application Ser. No. 17/183,503 filed on Feb. 24, 2021, which is a continuation of U.S. patent application Ser. No. 16/919,729 filed on Jul. 2, 2020, now U.S. Pat. No. 10,959,280, which is a continuation of U.S. patent application Ser. No. 16/377,846 filed on Apr. 8, 2019, now U.S. Pat. No. 10,764,954, which is a continuation of U.S. patent application Ser. No. 15/511,123 filed on Mar. 14, 2017, now U.S. Pat. No. 10,285,214, which is a U.S. National Stage of International Patent Application No. PCT/CN2014/086492 filed on Sep. 15, 2014. All of the aforementioned patent applications are hereby incorporated by reference in their entireties.

TECHNICAL FIELD

The present disclosure relates to the field of communications technologies, and in particular, to a communications method of a wearable device, a communications system, and a related device.

BACKGROUND

A wearable device such as a smart watch or a band usually communicates with a terminal device such as a mobile phone in a BLUETOOTH communication manner to implement functions such as event notification or information synchronization. For example, when the mobile phone has an incoming call, the smart watch may be notified in the BLUETOOTH communication manner, and then the smart watch has incoming call notification. The wearable device brings convenience to a user, and therefore is drawing attention from more equipment vendors.

At home, the wearable device and the terminal device may be placed at different locations. For example, the mobile phone is in a bedroom while the band is worn by a user in a living room, in this case, the mobile phone is far away from the band, because a communication coverage area of the BLUETOOTH is relatively small, the mobile phone cannot communicate with the band by using the BLUETOOTH such that communication between the mobile phone and the wearable device cannot be maintained.

SUMMARY

Embodiments of the present disclosure provide a communications method of a wearable device, a communications system, and a related device such that the terminal device may communicate with the wearable device by using a gateway when communication between a terminal device and a wearable device is disconnected.

A first aspect of the embodiments of the present disclosure provides a communications method of a wearable device, including determining, by a network connection device in a network to which user equipment belongs, that a second BLUETOOTH connection between the user equipment and the wearable device is disconnected, and establishing a first BLUETOOTH connection between the network connection device and the wearable device, receiving, by the network connection device, first information that is sent by the user equipment through a third communication connection to the network connection device, and sending, by the network connection device, the first information to the wearable device through the first BLUETOOTH connection.

In a first possible implementation manner of the first aspect of the embodiments of the present disclosure, before the receiving, by the network connection device, first information that is sent by the user equipment through a third communication connection to the network connection device, the method further includes receiving, by the network connection device, first configuration information sent by the user equipment, where the first configuration information includes a BLUETOOTH address of the wearable device and a key, and storing, by the network connection device, the first configuration information, where the first configuration information is used by the network connection device to send the first information to the wearable device through the first BLUETOOTH connection, or, receiving, by the network connection device, a procedure request message sent by the user equipment, where the procedure request message is used to request the network connection device to enable a BLUETOOTH pairing procedure with the wearable device, and enabling the BLUETOOTH pairing procedure with the wearable device according to the procedure request message, or, receiving, by the network connection device, a mode request message sent by the user equipment, where the mode request message is used to request the network connection device to enable a BLUETOOTH pairing mode, and enabling the BLUETOOTH pairing mode according to the mode request message to accept BLUETOOTH pairing with the wearable device.

With reference to the first aspect of the embodiments of the present disclosure, or the first possible implementation manner of the first aspect, in a second possible implementation manner of the first aspect of the embodiments of the present disclosure, before the receiving, by the network connection device, first information that is sent by the user equipment through a third communication connection to the network connection device, the method further includes receiving, by the network connection device, second configuration information sent by the user equipment, where the second configuration information includes BLUETOOTH service information supported by the wearable device, and establishing a mapping relationship between the BLUETOOTH service information and service information supported by the third communication connection, and storing the mapping relationship, where the sending, by the network connection device, the first information to the wearable device through the established first BLUETOOTH connection includes converting, according to the mapping relationship, first information sent by the user equipment through the third communication connection to first information sent through the first BLUETOOTH connection, and sending the first information to the wearable device through the first BLUETOOTH connection.

With reference to any one of the first aspect of the embodiments of the present disclosure, or the first to the second possible implementation manners of the first aspect, in a third possible implementation manner of the first aspect of the embodiments of the present disclosure, before the determining, by a network connection device in a network to which user equipment belongs, that a second BLUETOOTH connection between the user equipment and the wearable device is disconnected, the method further includes receiving a triggering command sent by the user equipment, where the triggering command is used to instruct to establish the first BLUETOOTH connection between the network connection device and the wearable device, or finding, by the network connection device, a BLUETOOTH signal of the wearable device, or after the network connection device finds the BLUETOOTH signal of the wearable device, sending an acknowledgment request message to the user equipment, where the acknowledgment request message is used to request the user equipment to determine whether the first BLUETOOTH connection be established between the network connection device and the wearable device, and receiving an acknowledgment message returned by the user equipment.

With reference to any one of the first aspect of the embodiments of the present disclosure, or the first to the third possible implementation manners of the first aspect, in a fourth possible implementation manner of the first aspect of the embodiments of the present disclosure, the establishing the first BLUETOOTH connection between the network connection device and the wearable device includes establishing the first BLUETOOTH connection between the network connection device and the wearable device by using a bridge device that communicates with the network connection device, and the sending the first information to the wearable device through the first BLUETOOTH connection includes transmitting, by the network connection device, the first information to the bridge device, and sending, by the bridge device, the first information to the wearable device through a BLUETOOTH connection between the bridge device and the wearable device.

With reference to any one of the first aspect of the embodiments of the present disclosure, or the first to the fourth possible implementation manners of the first aspect, in a fifth possible implementation manner of the first aspect of the embodiments of the present disclosure, the method further includes receiving, by the network connection device, second information sent by the wearable device through the first BLUETOOTH connection, and sending, by the network connection device, the second information to the user equipment through the third communication connection.

With reference to any one of the first aspect of the embodiments of the present disclosure, or the first to the fifth possible implementation manners of the first aspect, in a sixth possible implementation manner of the first aspect of the embodiments of the present disclosure, the method further includes receiving a first notification message sent by the user equipment, where the first notification message is used to instruct the network connection device to disconnect the first BLUETOOTH connection between the network connection device the wearable device, and disconnecting the first BLUETOOTH connection between the network connection device and the wearable device, or disconnecting the third communication connection between the network connection device and the user equipment, and disconnecting the first BLUETOOTH connection between the network connection device and the wearable device.

A second aspect of the embodiments of the present disclosure provides a communications method of a wearable device, including determining, by user equipment, that a second BLUETOOTH connection between the user equipment and the wearable device is disconnected, and if a first BLUETOOTH connection between a network connection device in a network to which the user equipment belongs and the wearable device is established, sending, by the user equipment, first information to the network connection device through a third communication connection to the network connection device such that the network connection device sends the first information to the wearable device through the first BLUETOOTH connection.

In a first possible implementation manner of the second aspect of the embodiments of the present disclosure, the determining, by user equipment, that a second BLUETOOTH connection between the user equipment and the wearable device is disconnected includes detecting, by the user equipment, that a second BLUETOOTH connection between the user equipment and the wearable device is disconnected, or when the user equipment determines that the third communication connection to the network connection device is established, disconnecting the second BLUETOOTH connection to the wearable device.

With reference to the second aspect of the embodiments of the present disclosure, or the first possible implementation manner of the second aspect, in a second possible implementation manner of the second aspect of the embodiments of the present disclosure, before the sending, by the user equipment, first information to the network connection device through a third communication connection to the network connection device, the method further includes sending, by the user equipment, first configuration information to the network connection device, where the first configuration information includes a BLUETOOTH address of the wearable device and a key, and sending, by the user equipment, third configuration information to the wearable device, where the third configuration information includes a BLUETOOTH address of the network connection device and a key, or, sending, by the user equipment, a mode request message to the wearable device, where the mode request message is used to request the wearable device to enable a BLUETOOTH pairing mode, and sending, by the user equipment, a procedure request message to the network connection device, where the procedure request message is used to request the network connection device to enable a BLUETOOTH pairing procedure with the wearable device, or sending, by the user equipment, a mode request message to the network connection device, where the mode request message is used to request the network connection device to enable a BLUETOOTH pairing mode, and sending, by the user equipment, a procedure request message to the wearable device, where the procedure request message is used to request the wearable device to enable a BLUETOOTH pairing procedure with the network connection device.

With reference to any one of the second aspect of the embodiments of the present disclosure, or the first to the second possible implementation manners of the second aspect, in a third possible implementation manner of the second aspect of the embodiments of the present disclosure, after the determining, by user equipment, that a second BLUETOOTH connection between the user equipment and the wearable device is disconnected, the method further includes sending, by the user equipment, a triggering command to the network connection device, where the triggering command is used to instruct to establish the first BLUETOOTH connection between the network connection device and the wearable device, and/or receiving, by the user equipment, an announcement message sent by the network connection device, where the announcement message is used to notify the user equipment that the first BLUETOOTH connection between the network connection device and the wearable device is established.

With reference to any one of the second aspect of the embodiments of the present disclosure, or the first to the third possible implementation manners of the second aspect, in a fourth possible implementation manner of the second aspect of the embodiments of the present disclosure, the method further includes finding, by the user equipment, a BLUETOOTH signal of the wearable device, establishing the second BLUETOOTH connection to the wearable device, and sending, by the user equipment, first information to the wearable device through the second BLUETOOTH connection, or after the third communication connection between the user equipment and the network connection device is disconnected, finding, by the user equipment, a BLUETOOTH signal of the wearable device, establishing the second BLUETOOTH connection to the wearable device, and sending, by the user equipment, first information to the wearable device through the second BLUETOOTH connection, or after the user equipment receives second notification message sent by the network connection device, where the second notification message is used to notify the user equipment that the first BLUETOOTH connection between the network connection device and the wearable device is disconnected, finding, by the user equipment, a BLUETOOTH signal of the wearable device, establishing the second BLUETOOTH connection to the wearable device, and sending, by the user equipment, first information to the wearable device through the second BLUETOOTH connection, or when the user equipment finds a BLUETOOTH signal of the wearable device, and when the user equipment does not perform information interaction with the wearable device by using the network connection device in a preset time, sending, to the network connection device by the user equipment, a request for disconnecting the first BLUETOOTH connection, establishing the second BLUETOOTH connection to the wearable device, and sending, by the user equipment, first information to the wearable device through the second BLUETOOTH connection.

With reference to any one of the second aspect of the embodiments of the present disclosure, or the first to the fourth possible implementation manners of the second aspect, in a fifth possible implementation manner of the second aspect of the embodiments of the present disclosure, the sending, by the user equipment, first information to the network connection device through a third communication connection to the network connection device includes sending, by the user equipment, the first information to the network connection device by using the Internet Protocol (IP), or sending, by the user equipment, the first information to the network connection device by using the Universal Plug and Play (UPnP) protocol, or sending, by the user equipment, the first information to the network connection device by using the Wi-Fi protocol.

A third aspect of the embodiments of the present disclosure provides a network connection device, including a communication establishment unit configured to determine that a second BLUETOOTH connection between user equipment and a wearable device is disconnected, and establish a first BLUETOOTH connection to the wearable device, an information receiving unit configured to receive first information that is sent by the user equipment through a third communication connection to the network connection device, and a sending unit configured to send the first information to the wearable device through the first BLUETOOTH connection established by the communication establishment unit.

In a first possible implementation manner of the third aspect of the embodiments of the present disclosure, the network connection device further includes a first configuration unit configured to receive first configuration information sent by the user equipment, where the first configuration information includes a BLUETOOTH address of the wearable device and a key, and store the first configuration information, where the first configuration information is used by the sending unit to send the first information to the wearable device through the first BLUETOOTH connection, or the first configuration unit configured to receive a procedure request message sent by the user equipment, where the procedure request message is used to request the network connection device to enable a BLUETOOTH pairing procedure with the wearable device, and enable the BLUETOOTH pairing procedure with the wearable device according to the procedure request message, or the first configuration unit configured to receive a mode request message sent by the user equipment, where the mode request message is used to request the network connection device to enable a BLUETOOTH pairing mode, and enable the BLUETOOTH pairing mode according to the mode request message to accept BLUETOOTH pairing with the wearable device.

With reference to the third aspect of the embodiments of the present disclosure, or the first possible implementation manner of the third aspect, in a second possible implementation manner of the third aspect of the embodiments of the present disclosure, the network connection device further includes a second configuration unit configured to receive second configuration information sent by the user equipment, where the second configuration information includes BLUETOOTH service information supported by the wearable device, and establish a mapping relationship between the BLUETOOTH service information and service information supported by the third communication connection, and store the mapping relationship, where the sending unit is configured to convert, according to the mapping relationship stored by the second configuration unit, first information sent by the user equipment through the third communication connection to first information sent through the first BLUETOOTH connection, and send the first information to the wearable device through the first BLUETOOTH connection.

With reference to any one of the third aspect of the embodiments of the present disclosure, or the first to the second possible implementation manners of the third aspect, in a third possible implementation manner of the third aspect of the embodiments of the present disclosure the communication establishment unit is configured to, after a triggering command sent by the user equipment is received, where the triggering command is used to instruct to establish the first BLUETOOTH connection between the network connection device and the wearable device, determine that second BLUETOOTH connection between the user equipment and the wearable device is disconnected, or after a BLUETOOTH signal of the wearable device is found, determine that the second BLUETOOTH connection between the user equipment and the wearable device is disconnected, or after a BLUETOOTH signal of the wearable device is found, send an acknowledgment request message to the user equipment, where the acknowledgment request message is used to request the user equipment to determine whether the first BLUETOOTH connection be established between the network connection device and the wearable device, and after an acknowledgment message returned by the user equipment is received, determine that the second BLUETOOTH connection between the user equipment and the wearable device is disconnected.

With reference to any one of the third aspect of the embodiments of the present disclosure, or the first to the third possible implementation manners of the third aspect, in a fourth possible implementation manner of the third aspect of the embodiments of the present disclosure the communication establishment unit is configured to establish the first BLUETOOTH connection to the wearable device by using a bridge device that communicates with the network connection device, and the sending unit is configured to transmit the first information to the bridge device, and the bridge device sends the first information to the wearable device through a BLUETOOTH connection between the bridge device and the wearable device.

With reference to any one of the third aspect of the embodiments of the present disclosure, or the first to the fourth possible implementation manners of the third aspect, in a fifth possible implementation manner of the third aspect of the embodiments of the present disclosure the information receiving unit is further configured to receive second information sent by the wearable device through the first BLUETOOTH connection, and the sending unit is further configured to send the second information to the user equipment through the third communication connection.

With reference to any one of the third aspect of the embodiments of the present disclosure, or the first to the fifth possible implementation manners of the third aspect, in a sixth possible implementation manner of the third aspect of the embodiments of the present disclosure, the network connection device further includes a disconnecting unit configured to receive a first notification message sent by the user equipment, where the first notification message is used to instruct the network connection device to disconnect the first BLUETOOTH connection between the network connection device the wearable device, and disconnect the first BLUETOOTH connection between the network connection device the wearable device, or disconnect the third communication connection between the network connection device and the user equipment, and disconnect the first BLUETOOTH connection between the network connection device the wearable device.

A fourth aspect of the embodiments of the present disclosure provides user equipment, including a communication determining unit configured to determine that a second BLUETOOTH connection between the user equipment and a wearable device is disconnected, and an information sending unit, configured to, if a first BLUETOOTH connection between a network connection device in a network to which the user equipment belongs and the wearable device is established, send first information to the network connection device through a third communication connection to the network connection device such that the network connection device sends the first information to the wearable device through the first BLUETOOTH connection.

In a first possible implementation manner of the fourth aspect of the embodiments of the present disclosure, the user equipment further includes a configuration sending unit configured to send first configuration information to the network connection device, where the first configuration information includes a BLUETOOTH address of the wearable device and a key, and the configuration sending unit is further configured to send third configuration information to the wearable device, where the third configuration information includes a BLUETOOTH address of the network connection device and a key, or, the configuration sending unit configured to send a mode request message to the wearable device, where the mode request message is used to request the wearable device to enable a BLUETOOTH pairing mode, and send a procedure request message to the network connection device, where the procedure request message is used to request the network connection device to enable a BLUETOOTH pairing procedure with the wearable device, or, the configuration sending unit configured to send a mode request message to the network connection device, where the mode request message is used to request the network connection device to enable a BLUETOOTH pairing mode, and send a procedure request message to the wearable device, where the procedure request message is used to request the wearable device to enable a BLUETOOTH pairing procedure with the network connection device.

With reference to the fourth aspect of the embodiments of the present disclosure, or the first possible implementation manner of the fourth aspect, in a second possible implementation manner of the fourth aspect of the embodiments of the present disclosure, the user equipment further includes a triggering unit configured to send a triggering command to the network connection device, where the triggering command is used to instruct to establish the first BLUETOOTH connection between the network connection device and the wearable device, and/or the triggering unit configured to receive an announcement message sent by the network connection device, where the announcement message is used to notify the user equipment that the first BLUETOOTH connection between the network connection device and the wearable device is established.

With reference to any one of the fourth aspect of the embodiments of the present disclosure, or the first to the second possible implementation manners of the fourth aspect, in a third possible implementation manner of the fourth aspect of the embodiments of the present disclosure, the user equipment further includes a communication establishment unit configured to find a BLUETOOTH signal of the wearable device and establish a second BLUETOOTH connection to the wearable device, or after the third communication connection between the user equipment and the network connection device is disconnected, find a BLUETOOTH signal of the wearable device and establish a second BLUETOOTH connection to the wearable device, or after a second notification message sent by the network connection device is received, where the second notification message is used to notify the user equipment that the first BLUETOOTH connection between the network connection device and the wearable device is disconnected, find a BLUETOOTH signal of the wearable device and establish a second BLUETOOTH connection to the wearable device, or when a BLUETOOTH signal of the wearable device is found, and when the user equipment does not perform information interaction with the wearable device by using the network connection device in a preset time, send, to the network connection device, a request for disconnecting the first BLUETOOTH connection, and establish the second BLUETOOTH connection between the user equipment and the wearable device, where the information sending unit is further configured to send the first information to the wearable device through the second BLUETOOTH connection.

A fifth aspect of the embodiments of the present disclosure provides a communications system, including a network connection device, user equipment, and a wearable device, where the network connection device is the network connection device according to any one of the third aspect of the embodiments of the present disclosure, the first to the third, or the fifth and the sixth possible implementation manners of the third aspect, and the user equipment is the user equipment according to any one of the fourth aspect of the embodiments of the present disclosure, or the first to the third possible implementation manners of the fourth aspect, and the wearable device is configured to after a first BLUETOOTH connection to the network connection device is established, receive first information sent by the network connection device.

A sixth aspect of the embodiments of the present disclosure provides a communications system, including a network connection device, at least one bridge device, user equipment, and a wearable device, where the at least one bridge device is separately connected to the network connection device by using an electrical power cable, where the network connection device is the network connection device according to any one of the third aspect of the embodiments of the present disclosure, or the first to the sixth possible implementation manners of the third aspect, and the user equipment is the user equipment according to any one of the fourth aspect of the embodiments of the present disclosure, or the first to the third possible implementation manners of the fourth aspect, and the wearable device is configured to, after a first BLUETOOTH connection is performed by using the bridge device connected to the network connection device, receive first information that is forwarded by the bridge device and that is sent by the network connection device through the first BLUETOOTH connection.

In the method of this embodiment, if a second BLUETOOTH connection between user equipment and a wearable device is disconnected, a first BLUETOOTH connection between a network connection device and the wearable device is established such that the network connection device may send, to the wearable device through the foregoing first BLUETOOTH connection, first information sent by the user equipment through a third communication connection to the network connection device. In this way, indirect communication between the user equipment and the wearable device is implemented by using the network connection device such that the user equipment and the wearable device are not limited by a communication range.

BRIEF DESCRIPTION OF DRAWINGS

To describe the technical solutions in the embodiments of the present disclosure or in other approaches more clearly, the following briefly describes the accompanying drawings required for describing the embodiments or the other approaches. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in orders except the order illustrated or described herein. In addition, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1A:
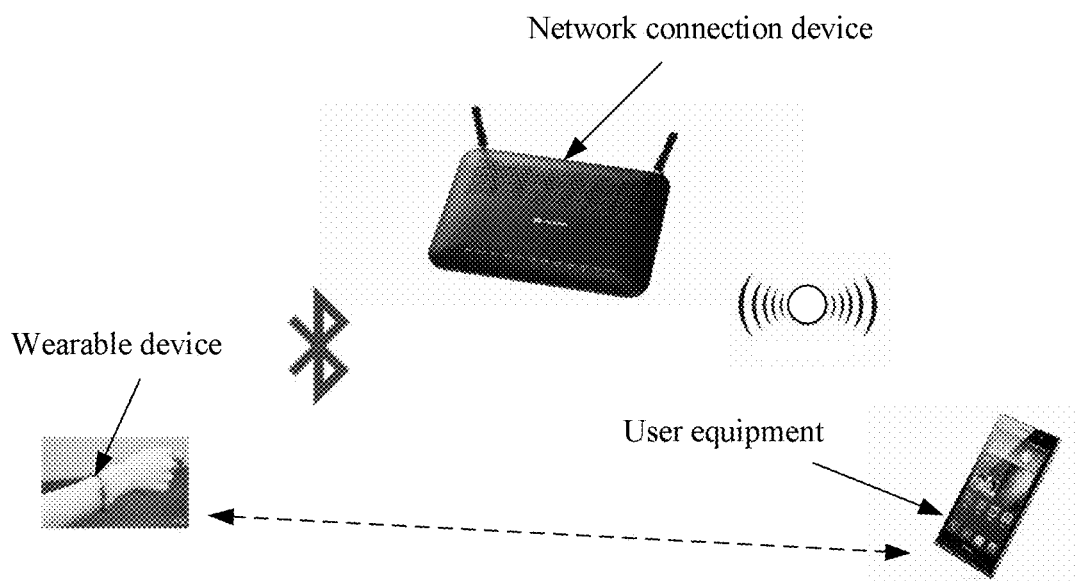
FIG. 1A is a schematic structural diagram of a communications system applied to a communications method of a wearable device according to an embodiment of the present disclosure.
Figure 1B:
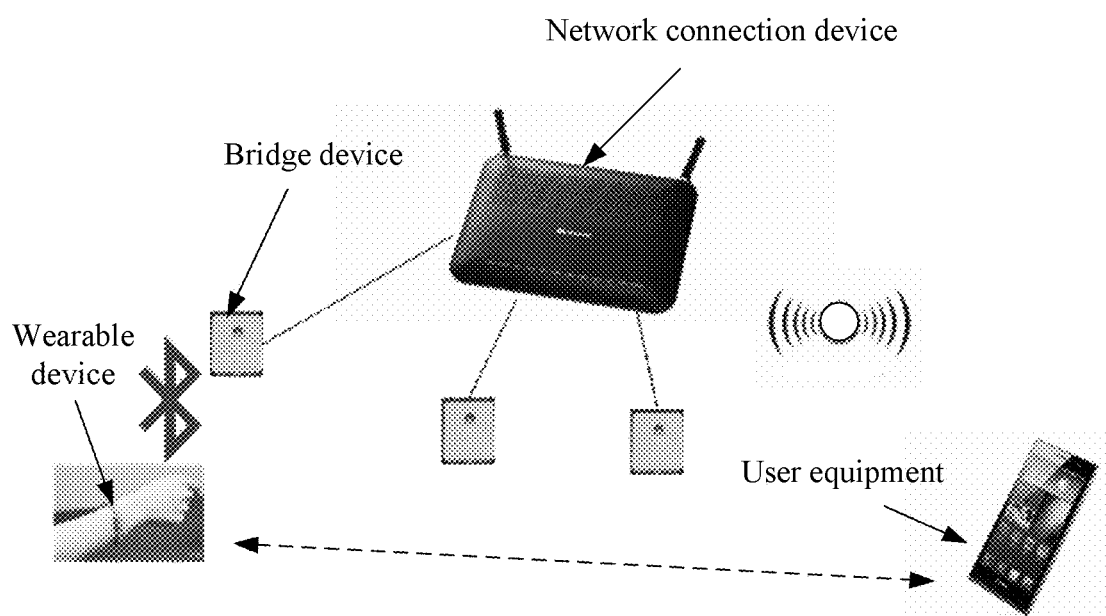
FIG. 1B is a schematic structural diagram of another communications system applied to a communications method of a wearable device according to an embodiment of the present disclosure.

An embodiment of the present disclosure provides a communications method of a wearable device that may be mainly applied to data communications systems shown in FIG. 1A and FIG. 1B. The communications system shown in FIG. 1A includes user equipment, a wearable device, and a network connection device. The user equipment may be a device that can access a network by using a network connection device, such as a mobile phone, a Pad, or a personal computer. The wearable device may be a device that can be used by pairing with the user equipment (for example, the wearable devices in FIGS. 1A-1B), such as a smart band or a smart watch. The network connection device may be a device that has a network connection function, such as a home Wi-Fi router and a gateway. In an embodiment of the present disclosure, the network connection device may require a BLUETOOTH function.

Generally, a communication connection between the user equipment and the wearable device may be directly established, for example, a BLUETOOTH communication connection. The user equipment may send a message to the wearable device for execution. For example, when the user equipment has an incoming call, the user equipment may send a message to the wearable device, and the wearable device displays the incoming call of the user equipment.

In this embodiment, however, when the communication connection between the user equipment and the wearable device is disconnected because of reasons such as a distance, an indirect communication connection between the user equipment and the wearable device may be implemented by using the network connection device. A communication connection that is of a protocol and that is between the network connection device and the user equipment is established, for example, a communication connection of the UPnP protocol or a communication connection of the Wi-Fi protocol. A communication connection that is of a BLUETOOTH protocol is established between the network connection device and the wearable device. A message sent by the user equipment to the wearable device may be indirectly transmitted to the wearable device by using the network connection device.

The communications system shown in FIG. 1B includes the user equipment, the network connection device, the wearable device, and at least one bridge device. For a connection between the user equipment and the network connection device, refer to the connection between the user equipment and the network connection device in FIG. 1A. Each bridge device may be connected to the network connection device by using an electrical power cable, the communication connection that is of the BLUETOOTH protocol may be established between the network connection device and the wearable device by using any one of the bridge devices such that the network connection device may encapsulate the information sent by the user equipment into a BLUETOOTH packet, and transmit the BLUETOOTH packet to the bridge device by using an electrical power cable protocol, and then the bridge device transmits the BLUETOOTH packet to the wearable device.

Main functions of the bridge device are to ensure a coverage area of communication between the network connection device and the wearable device and to ensure that a message sent by the network connection device may arrive to the wearable device.

Figure 2:
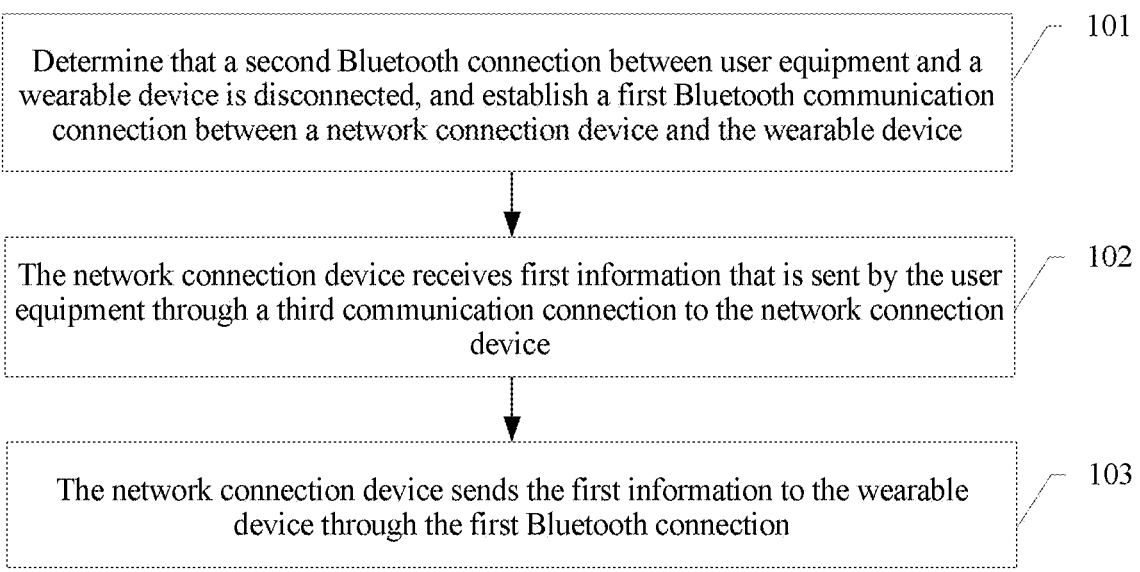
FIG. 2 is a flowchart of a communications method of a wearable device according to an embodiment of the present disclosure.

The communications method of a wearable device in this embodiment of the present disclosure is performed by the network connection device in the system shown in FIG. 1A or FIG. 1B. A flowchart is shown in FIG. 2, including the following steps.

Step 101: Determine that a second BLUETOOTH connection between the user equipment and the wearable device is disconnected, and establish a first BLUETOOTH connection between the network connection device in a network to which the user equipment belongs and the wearable device.

Generally, the second BLUETOOTH connection between the user equipment and the wearable device is established, and the user equipment may directly communicate with the wearable device. If the second BLUETOOTH connection is disconnected, in this embodiment, to implement that the user equipment indirectly communicates with the wearable device by using the network connection device, the network connection device separately establishes a communication connection to the wearable device and a communication connection to the user equipment. For a communication connection between the network connection device and the user equipment, if the user equipment accesses the network by using the network connection device, the communication connection between the network connection device and the user equipment is established. For a communication connection between the network connection device and the wearable device, establishing the first BLUETOOTH connection between the network connection device and the wearable device may be triggered in the following cases:

(1) When the user equipment finds that the second BLUETOOTH connection to the wearable device is disconnected, or when the user equipment finds that a third communication connection to the network connection device is established, the user equipment may directly send a triggering command to the user network connection device, where the triggering command is used to instruct to establish the first BLUETOOTH connection between the network connection device and the wearable device. When receiving the triggering command sent by the user equipment, the network connection device may determine that the second BLUETOOTH connection between the user equipment and the wearable device is disconnected, and actively establish the first BLUETOOTH connection to the wearable device. After receiving the triggering command, the network connection device sends a BLUETOOTH paging message. When finding that the second BLUETOOTH connection to the user equipment is disconnected, the wearable device determines whether the BLUETOOTH paging message sent by the network connection device can be received. In an embodiment, if the second BLUETOOTH connection between the wearable device and the user equipment is not disconnected, the wearable device still detects in real time whether the BLUETOOTH paging message sent by the network connection device is received, if the BLUETOOTH paging message is received, a BLUETOOTH paging response is sent to the network connection device, if the network connection device receives the BLUETOOTH paging response sent by the wearable device, the first BLUETOOTH connection to the wearable device is established.

(2) After finding a BLUETOOTH signal of the wearable device, the network connection device determines that the second BLUETOOTH connection between the user equipment and the wearable device is disconnected. The network connection device may periodically send the BLUETOOTH paging message. When finding that the second BLUETOOTH connection to the user equipment is disconnected, the wearable device determines whether the BLUETOOTH paging message sent by the network connection device can be received. In an embodiment, if the second BLUETOOTH connection between the wearable device and the user equipment is not disconnected, the wearable device still detects in real time whether the BLUETOOTH paging message is received, if the BLUETOOTH paging message is received, the BLUETOOTH paging response is sent to the network connection device, if the network connection device receives the BLUETOOTH paging response sent by the wearable device, the first BLUETOOTH connection to the wearable device is established.

(3) After finding a BLUETOOTH signal of the wearable device, the network connection device sends an acknowledgment request message to the user equipment, where the acknowledgment request message is used to request the user equipment to determine whether the first BLUETOOTH connection be established between the network connection device and the wearable device. If an acknowledgment message returned by the user equipment is received, the network connection device determines that the second BLUETOOTH connection between the user equipment and the wearable device is disconnected, and then establishes the first BLUETOOTH connection to the wearable device, if an unacknowledgment message returned by the user equipment is received, the first BLUETOOTH connection may be not established.

It should be noted that, in the second case, after the network connection device finds the BLUETOOTH signal of the wearable device and determine the second BLUETOOTH connection, the first BLUETOOTH connection is established, or after the network connection device finds the BLUETOOTH signal of the wearable device, the first BLUETOOTH connection is first established, and then the user equipment disconnects the second BLUETOOTH connection to determine that the second BLUETOOTH connection is disconnected.

It should be noted that, in the two cases of the communications systems shown in FIG. 1A and FIG. 1B, the established first BLUETOOTH connections between the network connection device and the wearable device are different. In the system shown in FIG. 1A, a direct first BLUETOOTH connection between the network connection device and the wearable device is established, however, in the system shown in FIG. 1B, an indirect first BLUETOOTH connection between the network connection device and the wearable device is established by using a bridge device that communicates with the network connection device.

It should be further noted that, optionally, after the first BLUETOOTH connection between the network connection device and the wearable device is established, the network connection device may further send an announcement message to the user equipment, where the announcement message is used to notify the user equipment that the first BLUETOOTH connection between the network connection device and the wearable device is established such that the user equipment may send first information to the wearable device by using the network connection device.

Step 102: The network connection device receives first information that is sent by the user equipment through a third communication connection to the network connection device, where the first information is sent to the network connection device by the user equipment through the third communication connection when the second BLUETOOTH connection between the user equipment and the wearable device is disconnected.

Step 103: The network connection device sends the first information to the wearable device through the first BLUETOOTH connection established in step 101.

After the first BLUETOOTH connection between the network connection device and the wearable device is established, the user equipment may first send, to the network connection device, the first information to be sent to the wearable device, and then the network connection device sends the first information to the wearable device. The first information may be content, an instruction, data, and the like that is sent by the user equipment to the wearable device. A format of the first information sent by the user equipment to the network connection device may be the same as or different from a format of the first information sent by the network connection device to the wearable device. When the user equipment sends the first information to the network connection device, a communications protocol format supported by the third communication connection may be used, and when the network connection device sends the first information to the wearable device, a BLUETOOTH protocol format is mainly used. Therefore, in a specific operation, the network connection device may convert first information in the communications protocol format supported by the third communication connection to first information in the BLUETOOTH protocol format.

In an embodiment, the third communication connection between the network connection device and the user equipment may be a communication connection that supports the IP such that the network connection device may receive the first information sent by the user equipment by using the IP. In an embodiment, the network connection device may receive the first information that is in the BLUETOOTH protocol format and that is carried in a payload of an IP packet, and send the first information to the wearable device through the first BLUETOOTH connection, or the network connection device may receive first information that is in an upper-layer protocol format and that is carried in an IP packet, and send the first information to the wearable device through the first BLUETOOTH connection. Upper-layer protocols include but are not limited to the UPnP protocol, the Digital Living Network Alliance (DLNA) protocol, the Intelligent Grouping and Resource Sharing protocol (IGRS), which is also referred to as the IGRS protocol, the Hypertext Transfer Protocol (HTTP), the Transmission Control Protocol (TCP), and the User Datagram Protocol (UDP). The network connection device converts the first information in the upper-layer protocol format to the first information in the BLUETOOTH protocol format.

The third communication connection may further be a communication connection that supports the UPnP protocol. The network connection device may receive first information that is in the UPnP protocol format and that is sent by the user equipment, or convert first information in the UPnP protocol format to first information in the BLUETOOTH protocol format, and then send the first information to the wearable device through the first BLUETOOTH connection.

The third communication connection may further be a connection that supports the Wi-Fi protocol. The network connection device may receive the first information that is in the BLUETOOTH protocol format and that is in a payload of a Media Access Control address (MAC) frame of the Wi-Fi protocol, and send the first information to the wearable device through the first BLUETOOTH connection, or the network connection device may receive the first information that is in an upper-layer protocol format and that is sent by the user equipment by using the Wi-Fi, and convert first information in the upper-layer protocol format to first information in the BLUETOOTH protocol format, and send the first information to the wearable device through the first BLUETOOTH connection. Upper-layer protocols include but are not limited to the UPnP protocol, the DLNA protocol, the IGRS, the HTTP, the TCP, the UDP, and the IP.

It should be further noted that, when the network connection device sends the first information through the first BLUETOOTH connection, for the system shown in FIG. 1A, the network connection device may directly send the first information to the wearable device, for the system shown in FIG. 1B, the communication connection of the BLUETOOTH protocol may be established between the network connection device and the wearable device by using any one of the bridge devices such that the network connection device may encapsulate the first information sent by the user equipment into the BLUETOOTH packet, and transmit the BLUETOOTH packet to the bridge device by using the electrical power cable protocol, and then the bridge device sends the BLUETOOTH packet to the wearable device in a communication range of the bridge device.

Further, for second information actively sent by the wearable device to the user equipment, the network connection device receives the second information that is sent by the wearable device through the first BLUETOOTH connection, where the second information may be a notification or data that is sent by the wearable device to the user equipment, information that is reported by the wearable device to the user equipment, or the like. The network connection device may send the second information to the user equipment through the third communication connection to the user equipment. A format of the second information sent by the wearable device to the network connection device may be the same as or different from a format of the second information sent by the network connection device to the user equipment.

It can be learned that in the method of this embodiment, if a second BLUETOOTH connection between user equipment and a wearable device is disconnected, a first BLUETOOTH connection is established between a network connection device and the wearable device, and the network connection device may send, to the wearable device through the first BLUETOOTH connection, first information sent by the user equipment. In this way, indirect communication between the user equipment and the wearable device is implemented by using the network connection device such that the user equipment and the wearable device are not limited by a communication range.

It should be noted that, in the communications method in steps 101 to 103, the user equipment indirectly communicates with the wearable device by using the network connection device in the network to which the user equipment belongs. In one case, under any one of following conditions, the first BLUETOOTH connection between the network connection device and the wearable device is disconnected, and the user equipment directly communicates with the wearable device The network connection device receives a first notification message sent by the user equipment, where the first notification message is used to instruct the network connection device to disconnect the first BLUETOOTH connection between the network connection device the wearable device, and the third communication connection between the network connection device and the user equipment is disconnected.

Figure 3:
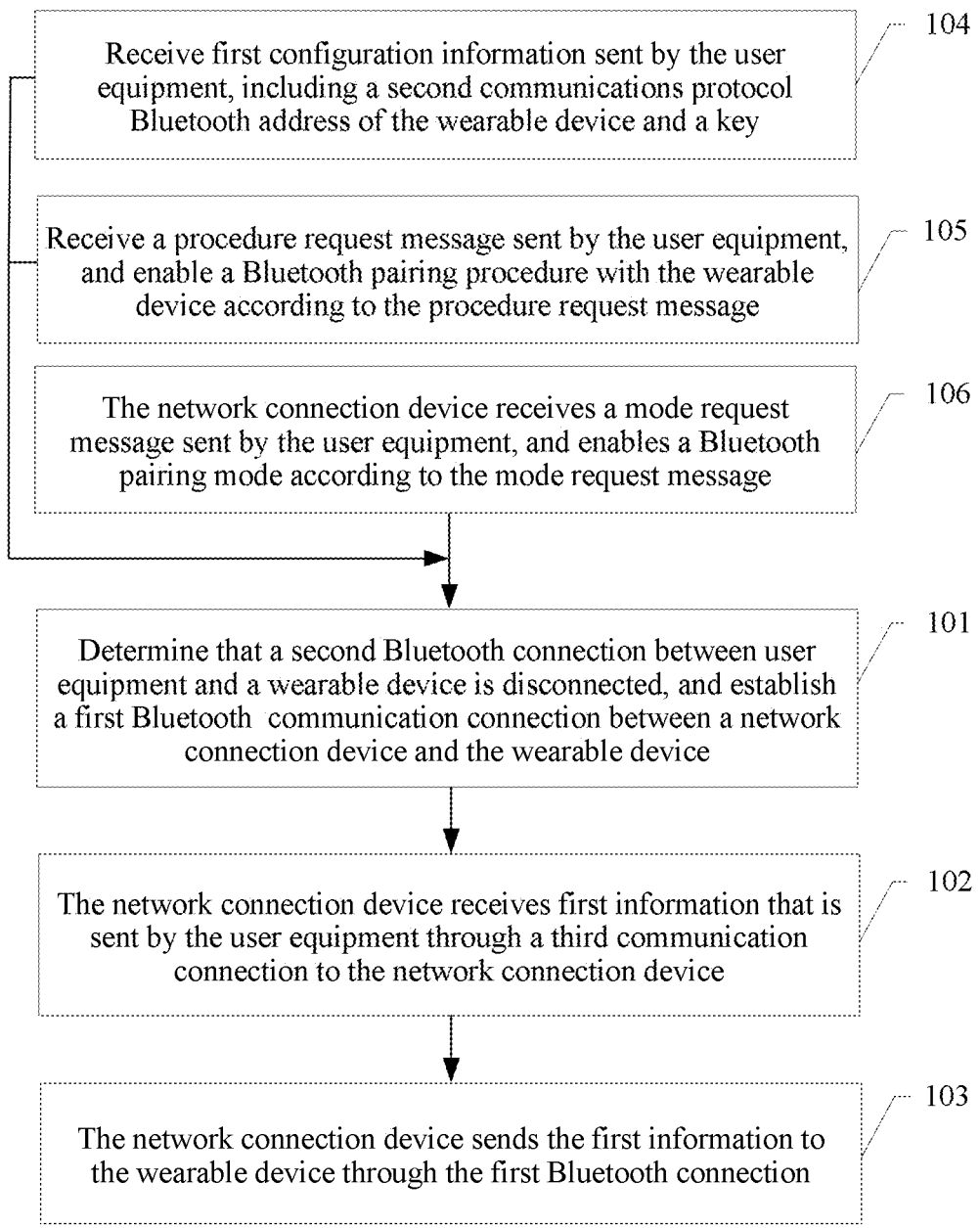
FIG. 3 is a flowchart of another communications method of a wearable device according to an embodiment of the present disclosure.

It should be further noted that, the communications method in steps 101 to 103 indicates communication that is performed after each device in the system shown in FIG. 1A or FIG. 1B is configured. Therefore, before step 101, the user equipment further configures the network connection device. In an embodiment, before step 101, the network connection device may further perform a configuration step in any one of the following manners. A flowchart is shown in FIG. 3, including the following steps.

(1) The user equipment directly performs configuration.

Step 104: The network connection device receives a first configuration information sent by the user equipment, where the first configuration information includes a BLUETOOTH address of the wearable device and a key for communication between the network connection device and the wearable device, and may further include information such as a pairing relationship between the user equipment and the wearable device. The network connection device stores the first configuration information, where the first configuration information is used by the network connection device to send the first information to the wearable device through the first BLUETOOTH connection. Optionally, if the first configuration information includes no pairing relationship between the user equipment and the wearable device, the network connection device may generate the pairing relationship between the user equipment and the wearable device according to the first configuration information. Therefore, when information is transmitted between the network connection device and the wearable device, the network connection device may establish the first BLUETOOTH connection according to the first configuration information and transmit the information through the first BLUETOOTH connection.

Further, the network connection device may further receive second configuration information sent by the user equipment, and the second configuration information includes BLUETOOTH service information supported by the wearable device, such as characteristic information of the BLUETOOTH protocol or a command of the BLUETOOTH protocol. Therefore, the network connection device may establish a mapping relationship between the BLUETOOTH service information and the service information supported by the third communication connection, and store the mapping relationship. When sending the first information to the wearable device, the network connection device may convert, according to the mapping relationship, the first information sent through the third communication connection to the first information sent through the first BLUETOOTH connection, and send the first information to the wearable device through the first BLUETOOTH connection.

When establishing the mapping relationship, the network connection device mainly establishes a correspondence between each piece of information in the BLUETOOTH service information and each piece of information in the service supported by the third communication connection, for example, establishes a correspondence between a command or a message in the BLUETOOTH protocol and a command or a message of the protocol supported by the third communication connection.

(2) The user equipment indirectly configures that the network connection device actively performs a BLUETOOTH pairing with the wearable device.

Step 105: The network connection device receives a procedure request message sent by the user equipment, where the procedure request message is used to request the network connection device to enable a BLUETOOTH pairing procedure with the wearable device, and the network connection device enables the BLUETOOTH pairing procedure with the wearable device according to the procedure request message. That is, the network connection device actively sends a BLUETOOTH pairing request to the wearable device. When the pairing succeeds, the network connection device may store information about the wearable device, including information such as the BLUETOOTH address and the key. Further, the network connection device generates the pairing relationship between the user equipment and the wearable device.

(3) The user equipment indirectly configures that the network connection device passively accepts the pairing with the wearable device.

Step 106: The network connection device receives a mode request message sent by the user equipment, where the mode request message is used to request the network connection device to enable a BLUETOOTH pairing mode, and the network connection device enables the BLUETOOTH pairing mode according to the mode request message to passively accept BLUETOOTH pairing with the wearable device. That is, the network connection device is set to a state of being searchable by another BLUETOOTH device within a period of time, and can accept a pairing request. When the pairing succeeds, the network connection device may store the information about the wearable device, including information such as the BLUETOOTH address and the key. Further, the network connection device generates the pairing relationship between the user equipment and the wearable device.

A function of the pairing relationship between the user equipment and the wearable device includes the user equipment first sends, to the network connection device, the first information that is sent to the wearable device, and the network connection device sends the first information to the corresponding wearable device according to the pairing relationship.

Figure 4:
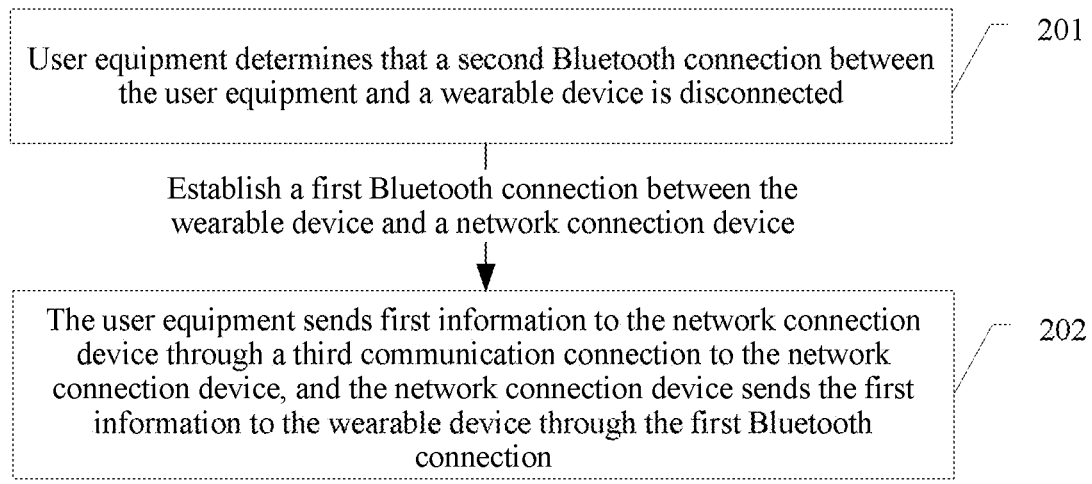
FIG. 4 is a flowchart of another communications method of a wearable device according to an embodiment of the present disclosure.

An embodiment of the present disclosure further provides another communications method of a wearable device that may be applied to the communications system shown in FIG. 1A or FIG. 1B. The method of this embodiment is a method performed by user equipment in the system. A flowchart is shown in FIG. 4, including the following steps.

Step 201: The user equipment determines that a second BLUETOOTH connection between the user equipment and the wearable device is disconnected. Generally, a communication connection between the user equipment and the wearable device is a BLUETOOTH communication connection. When the user equipment detects no BLUETOOTH signal of the wearable device, or strength of a detected BLUETOOTH signal of the wearable device is less than a threshold, it is determined that the second BLUETOOTH connection between the user equipment and the wearable device is disconnected. In an embodiment, in another case, when determining a third communication connection to a network connection device in a network to which the user equipment belongs is established, the user equipment may actively disconnect the second BLUETOOTH connection to the wearable device. Therefore, when the third communication connection is established between the user equipment and the network connection device, the second BLUETOOTH connection to the wearable device is disconnected.

It should be understood that, after the user equipment finds that the second BLUETOOTH connection to the wearable device is disconnected, if a first BLUETOOTH connection between the network connection device and the wearable device is established, the user equipment may perform step 202.

The user equipment may actively trigger the network connection device to establish the first BLUETOOTH connection to the wearable device. In an embodiment, the user equipment may send a triggering command to the network connection device, where the triggering command is used to instruct to establish the first BLUETOOTH connection between the network connection device and the wearable device such that the user equipment may indirectly communicate with the wearable device by using the network connection device. Therefore, the user equipment considers that the first BLUETOOTH connection between the network connection device and the wearable device is established, and performs a subsequent step 202. In another case, establishing the first BLUETOOTH connection between the network connection device and the wearable device is triggered by the wearable device. After establishing the first BLUETOOTH connection to the wearable device, the network connection device may send an announcement message to the user equipment, where the announcement message is used to notify the user equipment that the first BLUETOOTH connection between the network connection device and the wearable device is established such that the user equipment may perform the subsequent step 202 according to the announcement message. When the user equipment actively triggers the network connection device to establish the first BLUETOOTH connection to the wearable device, after the user equipment sends the triggering command, the user equipment further receive the announcement message returned by the network connection device, and then the user equipment may perform the subsequent step 202.

Step 202: When the user equipment includes information that to be sent to the wearable device, the user equipment sends first information to the network connection device through the third communication connection to the network connection device to which the user equipment belongs such that the network connection device may send the first information to the wearable device through the first BLUETOOTH connection.

In an embodiment, the third communication connection between the network connection device and the user equipment may support a connection of the IP such that the user equipment may send the first information to the network connection device by using the IP. In an embodiment, the first information in a BLUETOOTH protocol format is carried in a payload of an IP packet and sent to the network connection device, or the user equipment sends the first information in an upper-layer protocol format to the network connection device by using an IP packet, and upper-layer protocols include but are not limited to the UPnP protocol, the DLNA protocol, the IGRS, the HTTP, and the TCP.

The third communication connection may further be a connection that supports the UPnP protocol, and the user equipment sends the first information to the network connection device by using the UPnP protocol. In an embodiment, the first information in the UPnP protocol format is sent to the network connection device. The third communication connection may be a connection that supports the Wi-Fi protocol, and the user equipment sends the first information to the network connection device by using the Wi-Fi protocol. In an embodiment, the first information in the BLUETOOTH protocol format is carried in a payload of a MAC frame of the Wi-Fi protocol and sent to the network connection device, or the first information in an upper-layer protocol format is sent to the network connection device by using the Wi-Fi, and upper-layer protocols include but are not limited to the UPnP protocol, the DLNA protocol, the IGRS, the HTTP, the TCP, the UDP, and the IP.

The first information sent by the user equipment may be content, an instruction, data, and the like that is sent by the user equipment to the wearable device, and a format of the first information sent by the user equipment to the network connection device may be the same as or different from a format of the first information sent by the network connection device to the wearable device. When the user equipment sends the first information to the network connection device, a communications protocol format supported by the third communication connection may be used, and when the network connection device sends the first information to the wearable device, a BLUETOOTH protocol format is mainly used. Therefore, in a specific operation, the network connection device may convert first information in the communications protocol format supported by the third communication connection to first information in the BLUETOOTH protocol format. For a method performed by the network connection device, refer to the foregoing descriptions in this embodiment.

Further, the user equipment may receive, by using the network connection device, second information sent by the wearable device. The network connection device receives the second information that is sent by the wearable device through the first BLUETOOTH connection, and the second information may be a notification or data that is sent by the wearable device to the user equipment, information that is reported by the wearable device to the user equipment, or the like. The network connection device sends the second information to the user equipment through the third communication connection to the user equipment. A format of the second information sent by the wearable device to the network connection device may be the same as or different from a format of the second information sent by the network connection device to the user equipment.

Further, when any one of conditions occurs, the user equipment may establish the second BLUETOOTH connection to the wearable device, and the user equipment sends the first information to the wearable device through the second BLUETOOTH connection.

The user equipment finds a BLUETOOTH signal of the wearable device. For example, the user equipment finds that strength of a BLUETOOTH signal of the wearable device reaches a threshold.

After the third communication connection between the user equipment and the network connection device is disconnected, the user equipment finds the BLUETOOTH signal of the wearable device.

After the user equipment receives a second notification message sent by the network connection device, where the second notification message is used to notify the user equipment that the first BLUETOOTH connection between the network connection device and the wearable device is disconnected, the user equipment finds the BLUETOOTH signal of the wearable device.

When the user equipment finds the BLUETOOTH signal of the wearable device, and when the user equipment does not perform information interaction with the wearable device by using the network connection device in a preset time, the user equipment sends, to the network connection device, a request for disconnecting the first BLUETOOTH connection.

It can be learned that in the method of this embodiment, if a second BLUETOOTH connection between user equipment and a wearable device is disconnected, a first BLUETOOTH connection may be established between a network connection device of the user equipment and the wearable device. When the user equipment finds that the second BLUETOOTH connection to the wearable device is disconnected, the user equipment may send first information to the wearable device by using the network connection device. In this way, indirect communication between the user equipment and the wearable device is implemented by using the network connection device such that the user equipment and the wearable device can communicate with each other without being limited by a communication range.

It should be understood that the communications method in steps 201 and 202 is the communications method that is used after devices in the communications system are configured, however, before step 201, the user equipment may separately configure the wearable device and the network connection device in following manners:

(1) The user equipment directly and separately configures, for the network connection device and the wearable device, information required for performing first BLUETOOTH communication between the network connection device and the wearable device.

The user equipment may send first configuration information to the network connection device, where the first configuration information includes a BLUETOOTH address of the wearable device and a key for performing BLUETOOTH communication between the network connection device and the wearable device, and may further include a pairing relationship between the user equipment and the wearable device such that the network connection device stores the first configuration information. The user equipment may send third configuration information to the wearable device, where the third configuration information includes a BLUETOOTH address of the network connection device, and may further include information such as a key for performing communication between the network connection device and the wearable device.

Further, the user equipment may further send second configuration information to the network connection device, where the second configuration information includes BLUETOOTH service information supported by the wearable device. Therefore, the network connection device may establish, according to the second configuration information, a mapping relationship between the BLUETOOTH service information and service information supported by the third communication connection, and store the mapping relationship.

(2) The user equipment indirectly and separately configures a function of the network connection device and a function of the wearable device such that the network connection device may actively initiate a BLUETOOTH pairing procedure to the wearable device, and the wearable device may be passively paired with the network connection device.

The user equipment sends a mode request message to the wearable device, where the mode request message is used to request the wearable device to enable a BLUETOOTH pairing mode, that is, the wearable device is set to a state of being searchable by another BLUETOOTH device within a period of time, and can accept a pairing request. The user equipment sends a procedure request message to the network connection device, where the procedure request message is used to request the network connection device to enable a BLUETOOTH pairing procedure with the wearable device.

In an embodiment, the user equipment sends the procedure request message only to the network connection device, where the procedure request message is used to request the network connection device to enable a BLUETOOTH pairing procedure with the wearable device, instead of sending the mode request message to the wearable device to enable the BLUETOOTH pairing mode. The wearable device is preset to enable a pairing mode, that is, is preset to a state of being searchable by another BLUETOOTH device, and can accept a pairing request. In a pairing process, the wearable device may prompt a user whether to accept pairing with the network connection device. After the user determines to accept pairing with the network connection device, the wearable device accepts the pairing with the network connection device.

(3) The user equipment indirectly and separately configures a function of the network connection device and a function of the wearable device such that the wearable device may actively initiate a BLUETOOTH pairing procedure to the network connection device, and the network connection device may be passively paired with the wearable device.

The user equipment sends the mode request message to the network connection device, where the mode request message is used to request the network connection device to enable the BLUETOOTH pairing mode, that is, the network connection device is set to the state of being searchable by another BLUETOOTH device within a period of time, and can accept the pairing request. The user equipment sends the procedure request message to the wearable device, where the procedure request message is used to request the wearable device to enable the BLUETOOTH pairing procedure with the network connection device.

Figure 5A:
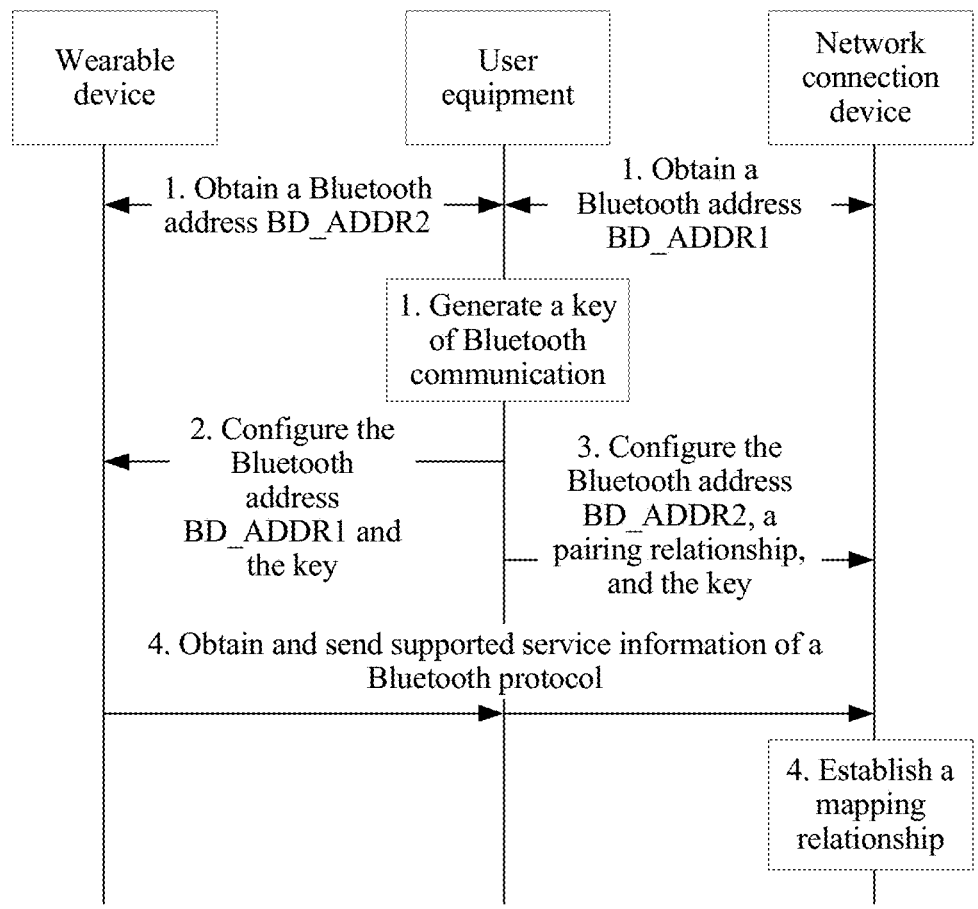
FIG. 5A is a flowchart of a method used by user equipment to configure each device in a communications system according to an embodiment of the present disclosure.

The following describes a communications method of a wearable device provided in the present disclosure is described by using an application embodiment. In the communications system of this embodiment shown in FIG. 1A, user equipment communicates with a network connection device by using the UPnP protocol, the network connection device communicates with the wearable device by using the BLUETOOTH protocol, and the user equipment communicates with the wearable device by using the BLUETOOTH protocol. In this embodiment:

1. The user equipment configures the network connection device and the wearable device. A flowchart is shown in FIG. 5A, including the following.

(1) The user equipment obtains a BLUETOOTH address BD_ADDR1 of the network connection device and a BLUETOOTH address BD_ADDR2 of the wearable device, and generates a key Link_Key for performing BLUETOOTH communication between the network connection device and the wearable device.

In an embodiment, the user equipment may obtain, by using a web client installed on the user equipment, the BLUETOOTH address BD_ADDR1 of the network connection device from a web server, that is, the network connection device, or the user equipment serves as a control point, and reads the BLUETOOTH address BD_ADDR1 from the network connection device (the network connection device is used as a UPnP device) by using the UPnP protocol.

(2) The user equipment sends information such as the BLUETOOTH address BD_ADDR1 of the network connection device and the key Link_Key to the wearable device for storage.

(3) The user equipment sends information such as the BLUETOOTH address BD_ADDR2 of the wearable device and the key Link_Key to the network connection device for storage. Optionally, the user equipment sends information such as a pairing relationship between the user equipment and the wearable device to the network connection device for storage.

If the network connection device receives no pairing relationship between the user equipment and the wearable device, the pairing relationship between the user equipment and the wearable device be established.

(4) The user equipment obtains BLUETOOTH service information supported by the wearable device from the wearable device, and sends the BLUETOOTH service information to the network connection device.

Therefore, the network connection device may establish a mapping relationship between the BLUETOOTH service information supported by the wearable device and service information of the UPnP protocol, and map the wearable device to a UPnP root device of the network connection device. For example, the network connection device establishes a mapping relationship between configuration management service (CMS) information of the UPnP protocol and heart rate service information supported by the wearable device A. Map the BLUETOOTH address of the wearable device to a universally unique identifier (UUID) of the UPnP root device.

B. Establish a mapping relationship between a function (action) and an event in a CMS service and the GATT and a characteristic command in a BLUETOOTH protocol, for example A value setting function (SetValues) in the CMS service corresponds to a write request (Write Request) in the BLUETOOTH protocol, a value obtaining function (GetValues) in the CMS service corresponds to a read request in the BLUETOOTH protocol, and a report event in the CMS service corresponds to a value handling notification in the BLUETOOTH protocol, and the like.

C. Establish a mapping relationship between a characteristic in the BLUETOOTH protocol and a parameter in a data model of a CMS service, for example Characteristics in the BLUETOOTH protocol, including a heart rate measurement, a heart rate measurement client characteristic configuration descriptor, a body sensor location, a heart rate control point, and the like, are considered as parameters in the data model of the CMS service.

D. Establish a mapping relationship between a characteristic having a notify attribute in the BLUETOOTH protocol and status variable in the CMS service such that the wearable device may report a characteristic value, for example:

The heart rate measurement in the BLUETOOTH protocol is corresponding to the status variable of the UPnP protocol.

Figure 5B:
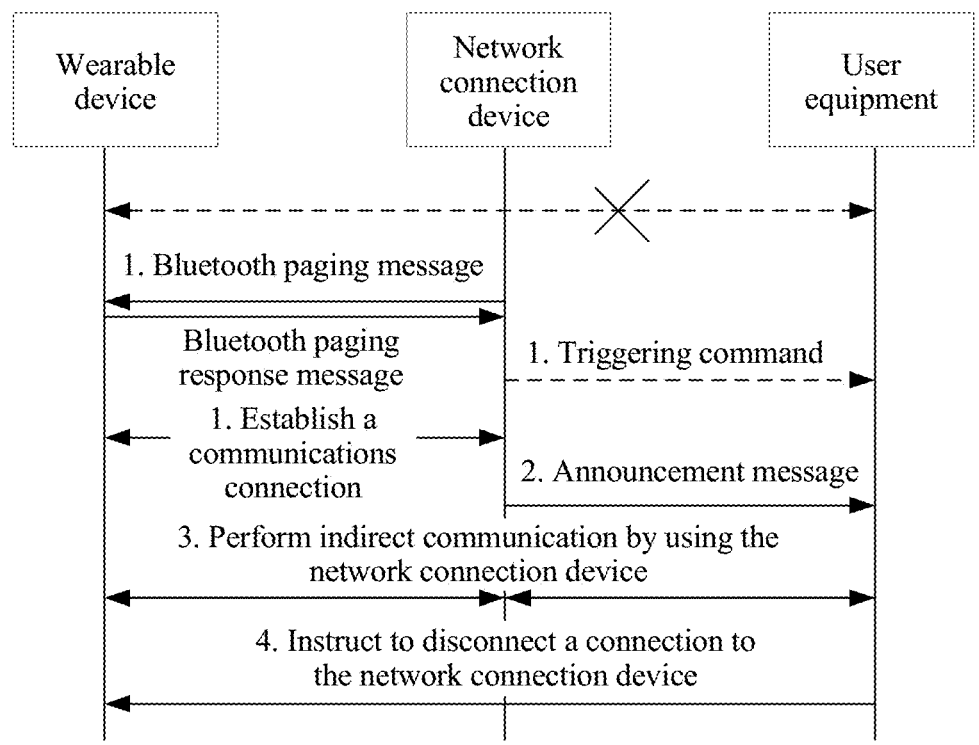
FIG. 5B is a flowchart of a method of indirect communication between user equipment and a wearable device according to an embodiment of the present disclosure.

2. The user equipment indirectly communicates with the wearable device by using the network connection device. A flowchart is shown in FIG. 5B, including the following.

(1) In a process of performing the BLUETOOTH communication between the user equipment and the wearable device, if the wearable device does not receive, within a period of time, a BLUETOOTH heartbeat packet sent by the user equipment, it is determined that the BLUETOOTH connection between the wearable device and the user equipment is disconnected. In this case, the wearable device continues to determine whether a BLUETOOTH paging message sent by the network connection device can be received. If the BLUETOOTH paging message sent by the network connection device can be received, the wearable device may return a BLUETOOTH paging response to establish a BLUETOOTH communication connection between the network connection device and the wearable device.

In another specific embodiment (as shown by dashed lines in FIG. 5B), if the user equipment does not receive, within a period of time, a BLUETOOTH heartbeat response message sent by the wearable device, it is determined that the BLUETOOTH connection to the wearable device is disconnected, and the user equipment sends the triggering command to the network connection device by using the UPnP protocol to trigger the network connection device to establish the BLUETOOTH communication connection to the wearable device.

(2) After the BLUETOOTH communication connection between the network connection device and the wearable device is established, an announcement message is sent to the user equipment, where the announcement message is used to notify the user equipment that the first BLUETOOTH connection between the network connection device and the wearable device is established, or that the wearable device is in an online state. For example, the announcement message is used to notify the user equipment that a UPnP root device corresponding to the wearable device is in the online state, and the announcement message is Simple Service Discovery Protocol (SSDP) alive announcement message.

(3) After receiving the SSDP alive announcement message sent by the network connection device, the user equipment may indirectly communicate with the wearable device.

The user equipment sends the first information to the network connection device by using the UPnP protocol, and the network connection device converts the first information sent by using the UPnP protocol to the first information sent by using the BLUETOOTH protocol, and sends the first information to the wearable device. For example, the first information sent by the user equipment to the wearable device is parameter value reading. The user equipment sends a GetValues ( ) command of the UPnP protocol to the network connection device, and the network connection device converts the GetValues ( ) command to the Read Request ( ) of the BLUETOOTH protocol and sends the Read Request ( ) to the wearable device.

When the wearable device sends second information to the user equipment, the wearable device sends the second information to the network connection device by using the BLUETOOTH protocol, and the network connection device converts second information sent by using the BLUETOOTH protocol to second information sent by using the UPnP protocol, and sends the second information to the user equipment. For example, the second information sent by the wearable device to the user equipment is heart rate reporting. The wearable device sends a heart rate measurement parameter value to the network connection device by using a Handle Value Notification ( ) message of the BLUETOOTH protocol, and the network connection device converts the heart rate measurement parameter value to a notification event of the UPnP protocol and report the heart rate measurement parameter value to the user equipment.

(4) When the user equipment finds that strength of a BLUETOOTH signal of the wearable device reaches a threshold, the user equipment instructs the network connection device to disconnect the BLUETOOTH connection to the wearable device such that the user equipment may communicate with the wearable device by establishing a direct communication connection.

The following describes a communications method of a wearable device provided in the present disclosure by using another following specific embodiment. In the communications system of this embodiment shown in FIG. 1B, the method in this embodiment is similar to the method of the application embodiment corresponding to FIG. 1A. A difference is when a network connection device communicates with a wearable device by using a bridge device, where the bridge device is connected to the network connection device by using an electrical power cable, and the bridge device mainly transmits a BLUETOOTH message sent by the network connection device or the wearable device.

Figure 6:
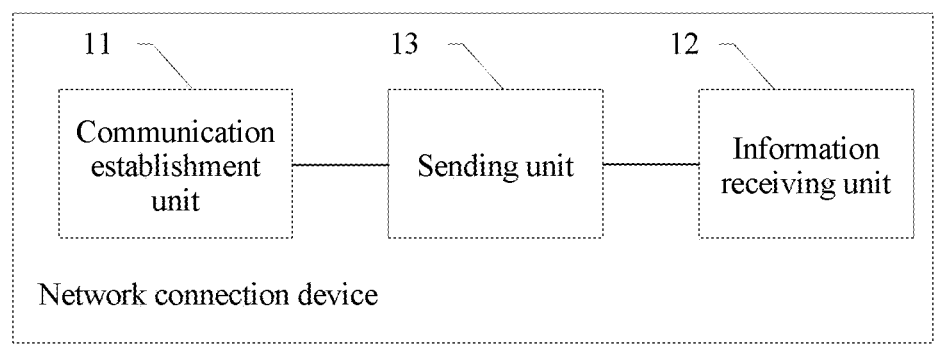
FIG. 6 is a schematic structural diagram of a network connection device according to an embodiment of the present disclosure.

An embodiment of the present disclosure further provides a network connection device, where the network connection device may be a gateway device such as a Wi-Fi router. A schematic structural diagram of the network connection device is shown in FIG. 6, including a communication establishment unit 11 configured to determine that a second BLUETOOTH connection between user equipment and a wearable device is disconnected, and establish a first BLUETOOTH connection to the wearable device, where, the communication establishment unit 11 is configured to, after a triggering command sent by the user equipment is received, where the triggering command is used to instruct to establish the first BLUETOOTH connection between the network connection device and the wearable device, determine that the second BLUETOOTH connection between the user equipment and the wearable device is disconnected, and establish the first BLUETOOTH connection to the wearable device, or after a BLUETOOTH signal of the wearable device is found, determine that the second BLUETOOTH connection between the user equipment and the wearable device is disconnected, and establish the first BLUETOOTH connection to the wearable device, or after a BLUETOOTH signal of the wearable device is found, send an acknowledgment request message to the user equipment, where the acknowledgment request message is used to request the user equipment to determine whether the first BLUETOOTH connection be established between the network connection device and the wearable device, and after an acknowledgment message returned by the user equipment is received, determine that the second BLUETOOTH connection between the user equipment and the wearable device is disconnected, and establish the first BLUETOOTH connection to the wearable device, an information receiving unit 12 configured to receive first information that is sent by the user equipment through a third communication connection to the network connection device, and a sending unit 13 configured to send the first information received by the information receiving unit 12 to the wearable device through the first BLUETOOTH connection established by the communication establishment unit 11.

It may be understood that, when establishing the first BLUETOOTH connection between the network connection device and the wearable device, the communication establishment unit 11 may establish the first BLUETOOTH connection to the wearable device by using a bridge device that communicates with the network connection device, and the sending unit 13 is configured to transmit the first information to the bridge device, and the bridge device sends the first information to the wearable device through the BLUETOOTH connection to the wearable device.

Further, in this embodiment, the information receiving unit 12 is further configured to receive second information sent by the wearable device through the first BLUETOOTH connection, and the sending unit 13 is further configured to send the second information to the user equipment through the third communication connection.

It can be learned that in this embodiment of the present disclosure, if a second BLUETOOTH connection between user equipment and a wearable device is disconnected, a first BLUETOOTH connection between a network connection device and the wearable device is established by using a communication establishment unit 11, when an information receiving unit 12 receives first information that is sent by the user equipment through a third communication connection to the network connection device, a sending unit 13 sends the first information to the wearable device through the first BLUETOOTH connection. In this way, indirect communication between the user equipment and the wearable device is implemented by using the network connection device such that the user equipment and the wearable device are not limited by a communication range.

Figure 7:
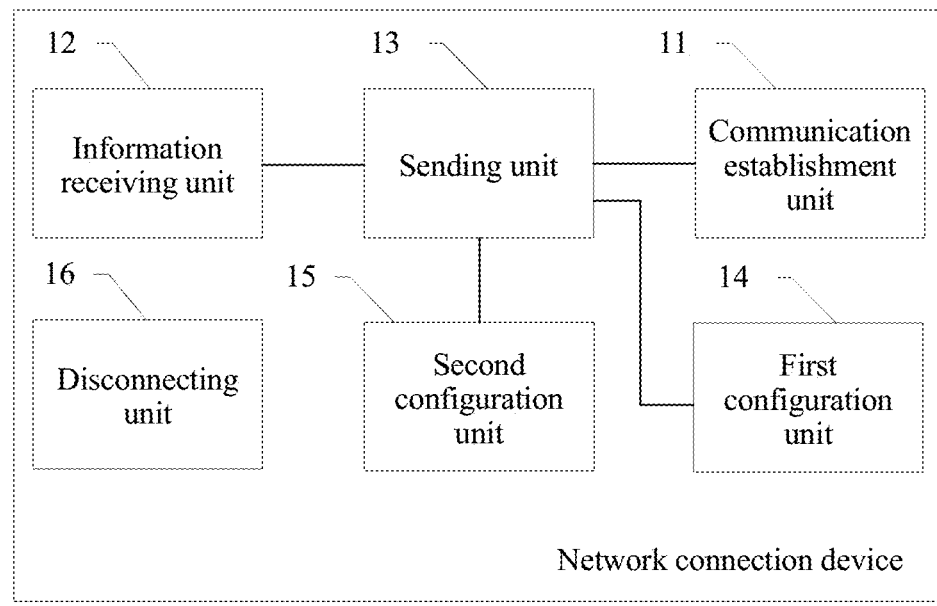
FIG. 7 is a schematic structural diagram of another network connection device according to an embodiment of the present disclosure.

As shown in FIG. 7, in a specific embodiment, in addition to the structure shown in FIG. 6, the network connection device includes a first configuration unit 14, a second configuration unit 15, and a disconnecting unit 16.

The first configuration unit 14 is configured to receive first configuration information sent by the user equipment, where the first configuration information includes a BLUETOOTH address of the wearable device and a key, and store the first configuration information, where the first configuration information further includes information such as a pairing relationship between the user equipment and the wearable device, and the first configuration information is used by the sending unit to send the first information to the wearable device through the first BLUETOOTH connection. In an embodiment, the first configuration unit 14 is configured to receive a procedure request message sent by the user equipment, where the procedure request message is used to request the network connection device to enable a BLUETOOTH pairing procedure with the wearable device, and enable the BLUETOOTH pairing procedure with the wearable device according to the procedure request message. In an embodiment, the first configuration unit 14 is configured to receive a mode request message sent by the user equipment, where the mode request message is used to request the network connection device to enable a BLUETOOTH pairing mode, and enable the BLUETOOTH pairing mode according to the mode request message to accept BLUETOOTH pairing with the wearable device. The first configuration unit 14 is further configured to establish the pairing relationship between the user equipment and the wearable device.

The second configuration unit 15 is configured to receive second configuration information sent by the user equipment, where the second configuration information includes BLUETOOTH service information supported by the wearable device, and establish a mapping relationship between the BLUETOOTH service information and service information supported by the third communication connection, and store the mapping relationship. The sending unit 13 is configured to convert, according to the mapping relationship stored by the second configuration unit 15, first information sent by the user equipment through the third communication connection to first information sent through the first BLUETOOTH connection, and send the first information to the wearable device through the first BLUETOOTH connection.

The disconnecting unit 16 is configured to receive a first notification message sent by the user equipment, where the first notification message is used to instruct the network connection device to disconnect the first BLUETOOTH connection between the network connection device the wearable device, and disconnect the first BLUETOOTH connection between the network connection device the wearable device, or disconnect the third communication connection between the network connection device and the user equipment, and disconnect the first BLUETOOTH connection between the network connection device the wearable device.

An embodiment of the present disclosure further provides user equipment. A schematic structural diagram of the user equipment is shown in FIG. 8, including a communication determining unit 20 configured to determine that a second BLUETOOTH connection between the user equipment and a wearable device is disconnected, where the communication determining unit 20 is configured to, when it is detected that the second BLUETOOTH connection to the wearable device is disconnected, or when the user equipment determines to establish a third communication connection to the network connection device, disconnect the second BLUETOOTH connection to the wearable device, and an information sending unit 21, configured to after the communication determining unit 10 determines that the first BLUETOOTH connection is disconnected, if a first BLUETOOTH connection between a network connection device in a network to which the user equipment belongs and the wearable device is established, send first information to the network connection device through a third communication connection to the network connection device such that the network connection device sends the first information to the wearable device through the first BLUETOOTH connection.

Figure 8:
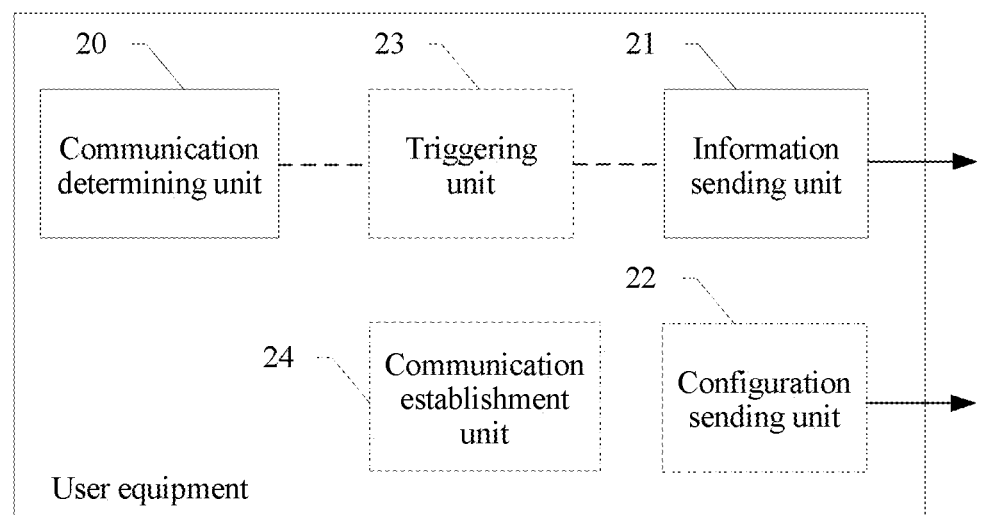
FIG. 8 is a schematic structural diagram of user equipment according to an embodiment of the present disclosure.

Further, the user equipment may further include a configuration sending unit 22, a triggering unit 23, and a communication establishment unit 24 (In FIG. 8, dashed lines are used to represent structures that are further included in the user equipment).

The configuration sending unit 22 is configured to send first configuration information to the network connection device, where the first configuration information includes a BLUETOOTH address of the wearable device and a key, and may further include information such as a pairing relationship between the user equipment and the wearable device, and the configuration sending unit 22 is further configured to send third configuration information to the wearable device, where the third configuration information includes a BLUETOOTH address of the network connection device and a key. In an embodiment, the configuration sending unit 22 is configured to send a mode request message to the wearable device, where the mode request message is used to request the wearable device to enable a BLUETOOTH pairing mode, and send a procedure request message to the network connection device, where the procedure request message is used to request the network connection device to enable a BLUETOOTH pairing procedure with the wearable device. In an embodiment, the configuration sending unit 22 is configured to send a mode request message to the network connection device, where the mode request message is used to request the network connection device to enable a BLUETOOTH pairing mode, and send a procedure request message to the wearable device, where the procedure request message is used to request the wearable device to enable a BLUETOOTH pairing procedure with the network connection device.

Further, the configuration sending unit 22 is further configured to send second configuration information to the network connection device, where the second configuration information includes BLUETOOTH service information supported by the wearable device. Therefore, the network connection device may establish, according to the second configuration information, a mapping relationship between the BLUETOOTH service information and service information supported by the third communication connection, and store the mapping relationship.

The triggering unit 23 is configured to send a triggering command to the network connection device, where the triggering command is used to instruct to establish the first BLUETOOTH connection between the network connection device and the wearable device, and/or the triggering unit 23 is configured to receive an announcement message sent by the network connection device, where the announcement message is used to notify the user equipment that the first BLUETOOTH connection between the network connection device and the wearable device is established.

It may be understood that, in the user equipment, after the communication determining unit 20 determines that the second BLUETOOTH connection to the wearable device is disconnected, the information sending unit 21 directly sends the first information, or after the communication determining unit 20 determines that the second BLUETOOTH connection to the wearable device is disconnected, the triggering unit 23 first triggers the network connection device to establish the first BLUETOOTH connection to the wearable device, or after the triggering unit 23 receives the announcement message, the information sending unit 21 sends the first information.

The communication establishment unit 24 is configured to find a BLUETOOTH signal of the wearable device and establish a second BLUETOOTH connection to the wearable device, or after the third communication connection between the user equipment and the network connection device is disconnected, find a BLUETOOTH signal of the wearable device and establish a second BLUETOOTH connection to the wearable device, or after a second notification message sent by the network connection device is received, where the second notification message is used to notify the user equipment that the first BLUETOOTH connection between the network connection device and the wearable device is disconnected, find a BLUETOOTH signal of the wearable device and establish a second BLUETOOTH connection to the wearable device, or when a BLUETOOTH signal of the wearable device is found, and when the user equipment does not perform information interaction with the wearable device by using the network connection device in a preset time, send, to the network connection device, a request for disconnecting the first BLUETOOTH connection and establish the second BLUETOOTH connection to the wearable device. In this case, the information sending unit 21 is further configured to send the first information to the wearable device through the second BLUETOOTH connection established by the communication establishment unit 24.

It can be learned that, in this embodiment, if a second BLUETOOTH connection between user equipment and a wearable device is disconnected, a first BLUETOOTH connection between a network connection device in a network to which the user equipment belongs and the wearable device is established. When a communication determining unit 20 in the user equipment finds that the second BLUETOOTH connection to the wearable device is disconnected, an information sending unit 21 may send the first information to the wearable device by using the network connection device. In this way, indirect communication between the user equipment and the wearable device is implemented by using the network connection device such that the user equipment and the wearable device are not limited by a communication range.

Figure 9:
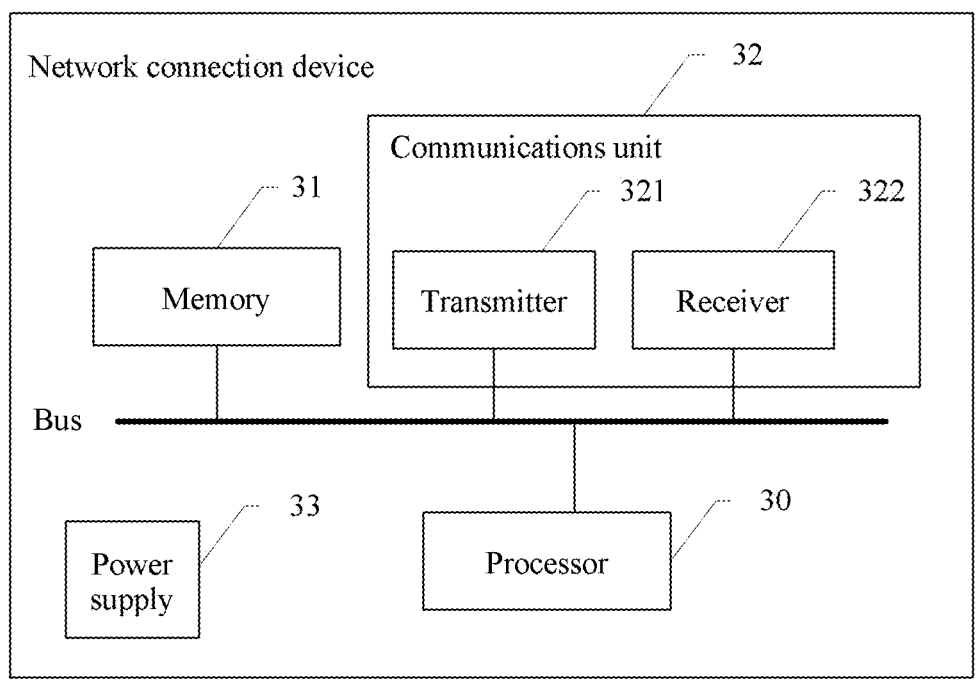
FIG. 9 is a schematic structural diagram of another network connection device according to an embodiment of the present disclosure.

An embodiment of the present disclosure further provides another network connection device, where the network connection device may be a gateway device such as a Wi-Fi router. A schematic structural diagram of the network connection device is shown in FIG. 9, including a processor 30 connected to a bus, a memory 31, a communications unit 32, and a power supply 33, where the communications unit 32 may include a transmitter 321 and a receiver 322.

The memory 31 may be configured to store a software program and a module. The processor 30 executes various functions or applications of a network connection device and implements data processing by running the software program and the module that are stored in the memory 31. The memory 31 mainly includes a program storage area and a data storage area, where the program storage area may store an operating system, an application program required by at least one function, and the data storage area may store data created according to use of the network connection device, and the like. In a specific implementation manner of the present disclosure, the memory 30 may include a volatile memory, for example, a nonvolatile random access memory (NVRAM), a phase change random access memory PRAM), or a magnetoresistive random access memory (MRAM), and may further include a nonvolatile memory, for example, at least one magnetic disk storage device, an electrically erasable programmable read-only memory (EEPROM), or a flash memory device such as a NOR flash memory or an NAND flash memory. The nonvolatile memory stores an operating system and an application program to be executed by the processor 30, and the processor 30 loads, from the nonvolatile memory, a running program and data to a memory, and stores digital content in a large number of storage apparatuses. The operating system is used to control and manage a general system task, for example, memory management, storage device control or power management, and various components and/or drives that facilitate communication between various software and hardware.

In this embodiment, the program storage area of the memory 31 may store a program that performs the communications method in the embodiment corresponding to FIG. 2 or FIG. 3.

The power supply 33 is configured to supply power to various parts of the network connection device to keep them running. The power supply 33 may be a built-in battery, for example, a common lithium-ion battery or a nickel-hydride battery, and may also include an external power supply that directly supplies power to the network connection device, for example, an alternating current (AC) adapter. In some embodiments of the present disclosure, the power supply 33 may have a broader definition, for example, may further include a power management system, a charging system, a power failure detection circuit, a power converter or inverter, a power status indicator (such as a light emitting diode), and any other components related to power generation, management, and distribution of the electronic device.

The processor 30 is a control center of the network connection device and is connected to each part of the entire network connection device by using various interfaces and lines. The processor 30 implements various functions of the network connection device and/or processes data by running or executing a software program and/or a module that are/is stored in the memory 31 and by invoking data stored in the memory 31. The processor 30 may be constituted by an integrated circuit (IC), for example, may be constituted by a single packaged IC, or may be constituted by connecting multiple packaged ICs that have a same function or different functions. For example, the processor 30 may include only a central processing unit (CPU), or may be a combination of a CPU, a digital signal processor (DSP), and a control chip (for example, a baseband chip) in a communications unit. In an implementation manner of the present disclosure, the CPU may be a single computing core, or may include multiple computing cores.

In this embodiment, the processor 30 may invoke a program stored in a program storage area, and performs the communications method in the embodiment corresponding to FIG. 2 or FIG. 3. Details are not described herein.

The communications unit 32 is configured to establish a communication channel such that the network connection device may connect the wearable device and the user equipment by using the communication channel. The communications unit 32 may include communication modules (not shown in FIG. 9), such as a wireless local area network (wireless LAN) module, a BLUETOOTH module, and a base band module, and radio frequency (RF) circuits corresponding to these communication modules to perform wireless local area network communication, BLUETOOTH communication and/or cellular communications system communication, such as wideband code division multiple access (W-CDMA) and/or high speed downlink packet access (HSDPA). These communication modules are configured to control communication between all the components in the network connection device, and may support direct memory access.

In different implementation manners of the present disclosure, each of communication modules in the communications unit 32 generally appears in a form of an integrated circuit chip, and the communication modules may be combined selectively instead of including all communication modules and corresponding antenna groups. For example, the communications unit 32 may include only a baseband chip, a radio frequency chip, and a corresponding antenna to provide a communication function in a cellular communications system. The electronic device may be connected to a cellular network or the Internet through a wireless communication connection established by the communications unit 32, for example, wireless LAN access or WCDMA access. In some optional implementation manners of the present disclosure, a communication module in the communications unit 32, for example, the baseband module, may be integrated into a processor 30, typically, such as APQ+ MDM platforms provided by QUALCOMM.

The radio frequency circuit is configured to receive and send information, or receive and send a signal during a call. Generally, the radio frequency circuit includes a well-known circuit used to perform these functions, which includes but is not limited to an antenna system, a radio frequency transceiver including the transmitter 321 and the receiver 322, one or more amplifiers, a tuner, one or more oscillators, a digital signal processor, a codec chipset, and a memory. In addition, the radio frequency circuit may further communicate with a network and another device by means of wireless communication. The wireless communications may use any communication standard or protocol, including but not limited to Global System for Mobile Communications (GSM), General Packet Radio Service (GPRS), Code Division Multiple Access (CDMA), WCDMA, High Speed Uplink Packet Access (HSUPA), and Long Term Evolution (LTE).

In this embodiment, the processor 30 in the network connection device may invoke the program stored in the memory 31 to implement the following functions.

The processor 30 is configured to determine that a second BLUETOOTH connection between user equipment and a wearable device is disconnected, and instruct to establish a first BLUETOOTH connection between the communications unit 32 and the wearable device. When receiving first information sent through a third communication connection between the user equipment and the network connection device, the receiver 322 in the communications unit 32 instructs the transmitter 321 in the communications unit 32 to send the first information to the wearable device through the established first BLUETOOTH connection. In this way, indirect communication between the user equipment and the wearable device is implemented by using the network connection device such that the user equipment and the wearable device are not limited by a communication range.

In an embodiment, when the receiver 322 receives a triggering command sent by the user equipment, where the triggering command is used to instruct to establish the first BLUETOOTH connection between the network connection device and the wearable device, the processor 31 determines that the second BLUETOOTH connection between the user equipment and the wearable device is disconnected, and establishes the first BLUETOOTH connection to the wearable device, or after the communications unit 32 finds a BLUETOOTH signal of the wearable device, for example, the transmitter 321 sends a BLUETOOTH paging message, and when the receiver 322 receives a BLUETOOTH paging response sent by the wearable device, the processor 30 determines that the second BLUETOOTH connection between the user equipment and the wearable device is disconnected, and instructs to establish the first BLUETOOTH connection between the communications unit 32 and the wearable device, or after the communications unit 32 finds a BLUETOOTH signal of the wearable device, the transmitter 321 sends an acknowledgment request message to the user equipment, where the acknowledgment request message is used to request the user equipment to determine whether the first BLUETOOTH connection be established between the network connection device and the wearable device, and the receiver 322 receives the acknowledgment message returned by the user equipment, the processor 30 determines that the second BLUETOOTH connection between the user equipment and the wearable device is disconnected, and then the processor 30 instructs to establish the first BLUETOOTH connection between the communications unit 32 and the wearable device.

It may be understood that, when the processor 30 instructs to establish the first BLUETOOTH connection between the communications unit 32 and the wearable device, the first BLUETOOTH connection to the wearable device may be established by using a bridge device that communicates with the network connection device. In an embodiment, the processor 30 instructs the transmitter 321 to transmit the first information to the bridge device, and the bridge device sends the first information to the wearable device through the BLUETOOTH connection to the wearable device.

Further, the processor 30 is further configured to when the receiver 322 receives second information that is sent by the wearable device through the first BLUETOOTH connection, instruct the transmitter 321 to send the second information to the user equipment through the third communication connection.

In a specific embodiment, the processor 30 is further configured to when the receiver 322 receives first configuration information sent by the user equipment, where the first configuration information includes a BLUETOOTH address of the wearable device and a key, store the first configuration information into the memory 31. The first configuration information is used by the sending unit to send the first information to the wearable device through the first BLUETOOTH connection, where the first configuration information further includes information such as a pairing relationship between the user equipment and the wearable device. In an embodiment, the processor 30 is configured to, when the receiver 322 receives a procedure request message sent by the user equipment, where the procedure request message is used to request the network connection device to enable a BLUETOOTH pairing procedure with the wearable device, enable the BLUETOOTH pairing procedure with the wearable device according to the procedure request message. In an embodiment, the processor 30 is configured to, when the receiver 322 receives a mode request message sent by the user equipment, where the mode request message is used to request the network connection device to enable a BLUETOOTH pairing mode, enable the BLUETOOTH pairing mode according to the mode request message to accept BLUETOOTH pairing with the wearable device. The processor 30 is further configured to establish the pairing relationship between the user equipment and the wearable device.

Further, the processor 30 is further configured to, when the receiver 322 receives second configuration information sent by the user equipment, where the second configuration information includes BLUETOOTH service information supported by the wearable device, establish a mapping relationship between the BLUETOOTH service information and service information supported by the third communication connection, and store the mapping relationship in the memory 31, and the processor 30 is configured to instruct, according to the mapping relationship, the transmitter 321 to convert first information sent by the user equipment through the third communication connection to first information sent through the first BLUETOOTH connection, and send the first information to the wearable device through the first BLUETOOTH connection.

In another specific embodiment, the processor 30 is further configured to, when the receiver 322 receives a first notification message sent by the user equipment, where the first notification message is used to instruct the network connection device to disconnect the first BLUETOOTH connection between the network connection device the wearable device, disconnect the first BLUETOOTH connection between the network connection device the wearable device, or disconnect the third communication connection between the network connection device and the user equipment, and disconnect the first BLUETOOTH connection between the network connection device the wearable device.

An embodiment of the present disclosure further provides another user equipment. A structure of the user equipment may be similar to the structure of the network connection device shown in FIG. 9, including a processor connected to a bus, a memory, a communications unit, and a power supply, where the communications unit may include a transmitter and a receiver.

The processor may invoke a program stored in the memory to implement the following functions.

The processor is configured to determine that a second BLUETOOTH connection between user equipment and a wearable device is disconnected, and if a first BLUETOOTH connection between a network connection device in a network to which the user equipment belongs and the wearable device is established, instruct the transmitter to send first information to the network connection device through a third communication connection to the network connection device such that the network connection device sends the first information to the wearable device through the first BLUETOOTH connection. In this way, indirect communication between the user equipment and the wearable device is implemented by using the network connection device such that the user equipment and the wearable device are not limited by a communication range. The processor is configured to detect that the second BLUETOOTH connection to the wearable device is disconnected, or when the user equipment determines to establish a third communication connection to the network connection device, disconnect the second BLUETOOTH connection to the wearable device, and determine that the second BLUETOOTH connection to the wearable device is disconnected.

In a specific embodiment, the processor is further configured to instruct the transmitter to send first configuration information to the network connection device, where the first configuration information includes a BLUETOOTH address of the wearable device and a key, and may further include information such as a pairing relationship between the user equipment and the wearable device, and instruct the transmitter to send third configuration information to the wearable device, where the third configuration information includes a BLUETOOTH address of the network connection device and a key. In an embodiment, the processor is further configured to instruct the transmitter to send a mode request message to the wearable device, where the mode request message is used to request the wearable device to enable a BLUETOOTH pairing mode, and send a procedure request message to the network connection device, where the procedure request message is used to request the network connection device to enable a BLUETOOTH pairing procedure with the wearable device. In an embodiment, the processor is further configured to instruct the transmitter to send a mode request message to the network connection device, where the mode request message is used to request the network connection device to enable a BLUETOOTH pairing mode, and send a procedure request message to the wearable device, where the procedure request message is used to request the wearable device to enable a BLUETOOTH pairing procedure with the network connection device.

Further, the processor is further configured to instruct the transmitter to send second configuration information to the network connection device, where the second configuration information includes BLUETOOTH service information supported by the wearable device. Therefore, the network connection device may establish, according to the second configuration information, a mapping relationship between the BLUETOOTH service information and service information supported by the third communication connection, and store the mapping relationship.

In another specific embodiment, the processor is further configured to instruct the transmitter to send a triggering command to the network connection device, where the triggering command is used to instruct to establish the first BLUETOOTH connection between the network connection device and the wearable device, and/or the receiver is configured to receive an announcement message sent by the network connection device, where the announcement message is used to notify the user equipment that the first BLUETOOTH connection between the network connection device and the wearable device is established.

It may be understood that, after it is determined that the second BLUETOOTH connection to the wearable device is disconnected, the processor may directly instruct the transmitter to send the first information, or after it is determined that the second BLUETOOTH connection to the wearable device is disconnected, instruct the transmitter to trigger the network connection device to establish the first BLUETOOTH connection to the wearable device, or after the receiver receives the announcement message, instruct the transmitter to send the first information.

In another embodiment, the processor further finds a BLUETOOTH signal of the wearable device and establishes the second BLUETOOTH connection to the wearable device, or after the third communication connection between the user equipment and the network connection device is disconnected, finds a BLUETOOTH signal of the wearable device and establishes a second BLUETOOTH connection to the wearable device, or after a second notification message sent by the network connection device is received, where the second notification message is used to notify the user equipment that the first BLUETOOTH connection between the network connection device and the wearable device is disconnected, finds a BLUETOOTH signal of the wearable device and establishes the second BLUETOOTH connection to the wearable device, or when a BLUETOOTH signal of the wearable device is found, and when the user equipment does not perform information interaction with the wearable device by using the network connection device in a preset time, sends, to the network connection device, a request for disconnecting the first BLUETOOTH connection, and establishes the second BLUETOOTH connection to the wearable device. Therefore, the processor is further configured to instruct the transmitter to send the first information to the wearable device through the established second BLUETOOTH connection.

An embodiment of the present disclosure further provides a communications system. A schematic structural diagram of the communications system is shown in FIG. 1A, including a network connection device, user equipment, and a wearable device.

A structure of the network connection device may be similar to the structure of the network connection device in the embodiment corresponding to FIG. 6, FIG. 7, or FIG. 9, and the network connection device is mainly used to connect a communication between the user equipment and the wearable device. A structure of the user equipment may be similar to the structure of the user equipment in the embodiment corresponding to FIG. 8, and details are not described herein.

The wearable device is configured to after a first BLUETOOTH connection to the network connection device is established, receive first information sent by the network connection device, and send second information to the network connection device through the first BLUETOOTH connection.

An embodiment of the present disclosure further provides another communications system. A schematic structural diagram of the communications system is shown in FIG. 1B, including a network connection device, at least one bridge device, user equipment, and a wearable device. The at least one bridge device is separately connected to the network connection device by using an electrical power cable, and the bridge device is configured to only forward a message of a second communications protocol between the network connection device and the wearable device, and ensure a communication range between the network connection device and the wearable device.

A structure of the network connection device may be similar to the structure of the network connection device in the embodiment corresponding to FIG. 6, FIG. 7, or FIG. 9, and is mainly used to connect a communication between the user equipment and the wearable device. A structure of the user equipment may be similar to the structure of the user equipment in the embodiment corresponding to FIG. 8, and details are not described herein.

The wearable device is configured to, after a first BLUETOOTH connection is performed by using the bridge device connected to the network connection device, receive first information that is forwarded by the bridge device and that is sent by the network connection device through the first BLUETOOTH connection.

A person of ordinary skill in the art may understand that all or some of the steps of the methods in the embodiments may be implemented by a program instructing relevant hardware. The program may be stored in a computer readable storage medium. The storage medium may include a read-only memory (ROM), a random-access memory (RAM), a magnetic disk, or an optical disc.

The communications method of a wearable device, the communications system, and the related device that are provided in the embodiments of the present disclosure are described in detail above. The principle and implementation of the present disclosure are described herein by using specific examples. The description about the embodiments is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limit to the present disclosure.

The invention claimed is:

1. A communication system, comprising:
a wearable device; and
an electronic device configured to:
establish a first communication connection with the wearable device; and
establish a second communication connection with a first device;
wherein the wearable device is configured to establish a third communication connection with the first device;
wherein the electronic device is further configured to send first information to the wearable device via the first communication connection in a case that the first communication connection, the second communication connection, and the third communication connection are maintained;
wherein the wearable device is further configured to: receive the first information via the first communication connection;
wherein the electronic device is further configured to send second information to the wearable device via the second communication connection in a case that the first communication connection is disconnected, and the second communication connection and the third communication connection are maintained;
wherein the wearable device is further configured to: receive the second information via the third communication connection.

2. The communication system of claim 1, wherein the electronic device is further configured to:
detect a BLUETOOTH signal of the wearable device after the first communication connection is disconnected;
establish a BLUETOOTH connection with the wearable device; and
send third information to the wearable device via the BLUETOOTH connection;
wherein the wearable device is further configured to: receive the third information via the BLUETOOTH connection.

3. The communication system of claim 2, wherein the electronic device is further configured to detect the BLUETOOTH signal of the wearable device by detecting that a strength of the BLUETOOTH signal of the wearable device is equal to or exceeds a threshold.

4. The communication system of claim 1, wherein the wearable device is further configured to send fourth information to the electronic device via the BLUETOOTH connection, and wherein the electronic device is further configured to receive the fourth information via the BLUETOOTH connection.

5. The communication system of claim 1, wherein the electronic device is further configured to send configuration information of the first device to the wearable device via the first communication connection, and wherein the wearable device is further configured to receive the configuration information; and establish the third communication connection with the first device by: establishing the third communication connection with the first device according to the configuration information.

6. The communication system of claim 1, wherein the electronic device is further configured to configure the configuration information of the first device.

7. The communication system of claim 5, wherein the configuration information comprises a key for establishing the third communication connection with the first device.

8. The communication system of claim 1, wherein the first communication connection comprises a connection supporting BLUETOOTH protocol, and wherein the second communication connection comprises a connection supporting WI-FI protocol.

9. The communication system of claim 1, wherein the electronic device is configured to detect that the first communication connection is disconnected in a case that the electronic device does not detect a BLUETOOTH signal of the wearable device.

10. The communication system of claim 1, wherein the first information comprises an indication of a first incoming call.

11. An electronic device, comprising:
a memory configured to store instructions; and
a processor coupled to the memory and configured to execute the instructions to cause the electronic device to:
establish a first communication connection with a wearable device;
establish a second communication connection with a first device;
send first information to the wearable device via the first communication connection in a case that the first communication connection, and the second communication connection and a third communication connection between the wearable device and the first device are maintained; and
send second information to the wearable device via the second communication connection in a case that the first communication connection is disconnected, and the second communication connection and the third communication connection are maintained.

12. The electronic device of claim 11, wherein the processor is further configured to execute the instructions to cause the electronic device to:
detect a BLUETOOTH signal of the wearable device after the first communication connection is disconnected;
establish a BLUETOOTH connection with the wearable device; and
send third information to the wearable device via the BLUETOOTH connection in a case that the second communication connection and the third communication connection are maintained.

13. The electronic device of claim 12, wherein the processor is further configured to execute the instructions to cause the electronic device to detect the BLUETOOTH signal of the wearable device by detecting that a strength of the BLUETOOTH signal of the wearable device is equal to or exceeds a threshold.

14. The electronic device of claim 11, wherein the processor is further configured to send configuration information of the first device to the wearable device via the first communication connection, wherein the configuration information is used to establish the third communication connection with the first device.

15. The electronic device of claim 14, wherein the processor is further configured to execute the instructions to cause the electronic device to configure the configuration information of the first device.

16. The electronic device of claim 11, wherein the first information comprises an indication of a first incoming call.

17. An wearable device, comprising:
a memory configured to store instructions; and
a processor coupled to the memory and configured to execute the instructions to cause the wearable device to:
establish a first communication connection with the electronic device, wherein the electronic device is being connected to a first device via a second communication connection; and
establish a third communication connection with the first device;
receive first information sent by the electronic device via the first communication connection in a case that the first communication connection, the second communication connection and the third communication connection are maintained;
receive second information sent by the electronic device via the third communication connection in a case that the first communication connection is disconnected, and the second communication connection and the third communication connection are maintained.

18. The wearable device of claim 17, wherein the processor is further configured to execute the instructions to cause the wearable device to receive configuration information of the first device sent by the electronic device via the first communication connection; and, establish the third communication connection with the first device according to the configuration information.

19. The wearable device of claim 18, wherein the configuration information comprises a key for establishing the third communication connection with the first device.

20. The wearable device of claim 17, wherein the processor is further configured to execute the instructions to cause the wearable device to send a third information to the electronic device via the third communication connection in a case that the first communication connection is disconnected, and the second communication connection and the third communication connection are maintained.

* * * * *